(12) United States Patent
Shen-Orr et al.

(10) Patent No.: US 7,920,702 B2
(45) Date of Patent: Apr. 5, 2011

(54) DIGITAL RIGHTS MANAGEMENT SYSTEM AND METHOD

(75) Inventors: Chaim Shen-Orr, Haifa (IL); Eliphaz Hibshoosh, Tel Aviv (IL); Gyora Benedek, Haifa (IL); Hillel Solow, Beit Shemesh (IL); Yaacov Belenky, Maaleh Adumim (IL); Yossi Tsuria, Jerusalem (IL); Zvi Shkedy, Karmiel (IL)

(73) Assignee: NDS Limited, Staines, Middlesex (GB)

( * ) Notice: Subject to any disclaimer, the term of this patent is extended or adjusted under 35 U.S.C. 154(b) by 0 days.

(21) Appl. No.: 12/388,717

(22) Filed: Feb. 19, 2009

(65) Prior Publication Data
US 2009/0154697 A1    Jun. 18, 2009

Related U.S. Application Data

(62) Division of application No. 10/472,286, filed as application No. PCT/IL02/00137 on Feb. 21, 2002, now Pat. No. 7,512,986.

(60) Provisional application No. 60/279,889, filed on Mar. 28, 2001, provisional application No. 60/338,279, filed on Dec. 4, 2001.

(51) Int. Cl.
*H04L 9/32* (2006.01)
*H04N 7/167* (2006.01)

(52) U.S. Cl. .................. 380/202; 380/210; 713/176

(58) Field of Classification Search .................. 380/210, 380/202; 713/176
See application file for complete search history.

(56) References Cited

U.S. PATENT DOCUMENTS 4,120,030 A    10/1978    Johnstone
(Continued)

FOREIGN PATENT DOCUMENTS

JP    07319729    12/1995
(Continued)

OTHER PUBLICATIONS

Ulrich Kohl, et al., "Safeguarding Digital Library Contents and Users", D-Lib Magazine, Sep. 1997, ISSN 1082-9873, 1997.
(Continued)

*Primary Examiner* — Michael Pyzocha
(74) *Attorney, Agent, or Firm* — Husch Blackwell LLP

(57) ABSTRACT

A system and a method for providing variable security mechanisms for securing digital content, in which a single security mechanism is not used for all content. Instead, at least one characteristic or feature of the security mechanism is varied between units, instances or categories of content. Therefore, even if unauthorized access is gained to a single unit of content, the overall integrity and security of the system for content distribution is not compromised. Preferably, security is provided though a general mechanism, which is then varied in order to provide variable, dissimilar security schemes for different types of content. By "type of content", it is meant any of a single unit of content, a single instance of content or a single category of content. For example, for a category of content, the content may be characterized according to the identity of the content itself, such as the title of a movie for example, and/or according to the owner of a particular copy of the content. Thus, different security schemes may optionally and preferably be generated from a particular root structure. Related apparatus and methods are also provided.

17 Claims, 8 Drawing Sheets

U.S. PATENT DOCUMENTS

| | | | |
|---|---|---|---|
| 4,796,220 A | 1/1989 | Wolfe | |
| 4,847,902 A | 7/1989 | Hampson | |
| 4,864,616 A | 9/1989 | Pond et al. | |
| 5,014,234 A | 5/1991 | Edwards, Jr. | |
| 5,058,164 A | 10/1991 | Elmer et al. | |
| 5,222,134 A | 6/1993 | Waite et al. | |
| 5,237,614 A | 8/1993 | Weiss | |
| 5,282,249 A | 1/1994 | Cohen et al. | |
| 5,351,293 A | 9/1994 | Michener et al. | |
| 5,386,369 A | 1/1995 | Christiano | |
| 5,390,297 A | 2/1995 | Barber et al. | |
| 5,422,674 A * | 6/1995 | Hooper et al. | 375/240.15 |
| 5,481,609 A | 1/1996 | Cohen et al. | |
| 5,495,411 A | 2/1996 | Ananda | |
| 5,544,244 A | 8/1996 | Ogura et al. | |
| 5,602,916 A | 2/1997 | Grube et al. | |
| 5,604,528 A | 2/1997 | Edwards et al. | |
| 5,613,004 A | 3/1997 | Cooperman et al. | |
| 5,615,264 A | 3/1997 | Kazmierczak et al. | |
| 5,671,412 A | 9/1997 | Christiano | |
| 5,673,316 A | 9/1997 | Auerbach et al. | |
| 5,715,403 A | 2/1998 | Stefik | |
| 5,757,914 A | 5/1998 | McManis | |
| 5,764,762 A | 6/1998 | Kazmierczak et al. | |
| 5,854,924 A | 12/1998 | Rickel et al. | |
| 5,857,025 A | 1/1999 | Anderson et al. | |
| 5,892,899 A | 4/1999 | Aucsmith et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,940,506 A | 8/1999 | Chang et al. | |
| 5,943,422 A | 8/1999 | Van Wie et al. | |
| 5,949,877 A | 9/1999 | Traw et al. | |
| 5,956,034 A | 9/1999 | Sachs et al. | |
| 5,969,750 A * | 10/1999 | Hsieh et al. | 348/14.1 |
| 5,974,550 A | 10/1999 | Maliszewski | |
| 5,991,399 A | 11/1999 | Graunke et al. | |
| 5,991,402 A | 11/1999 | Jia et al. | |
| 5,991,403 A | 11/1999 | Aucsmith et al. | |
| 6,002,769 A | 12/1999 | McGough | |
| 6,009,543 A | 12/1999 | Shavit | |
| 6,041,122 A | 3/2000 | Graunke et al. | |
| 6,044,469 A | 3/2000 | Horstmann | |
| 6,052,780 A | 4/2000 | Glover | |
| 6,069,647 A | 5/2000 | Sullivan et al. | |
| 6,088,452 A | 7/2000 | Johnson et al. | |
| 6,105,137 A | 8/2000 | Graunke et al. | |
| 6,112,181 A | 8/2000 | Shear et al. | |
| 6,128,735 A | 10/2000 | Goldstein et al. | |
| 6,138,119 A | 10/2000 | Hall et al. | |
| 6,148,407 A | 11/2000 | Aucsmith | |
| 6,157,721 A | 12/2000 | Shear et al. | |
| 6,170,060 B1 * | 1/2001 | Mott et al. | 726/29 |
| 6,175,925 B1 | 1/2001 | Nardone et al. | |
| 6,178,509 B1 | 1/2001 | Nardone et al. | |
| 6,184,683 B1 | 2/2001 | Emsley et al. | |
| 6,185,683 B1 | 2/2001 | Ginter et al. | |
| 6,205,473 B1 | 3/2001 | Thomasson et al. | |
| 6,205,550 B1 | 3/2001 | Nardone et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,272,484 B1 | 8/2001 | Martin et al. | |
| 6,292,569 B1 | 9/2001 | Shear et al. | |
| 6,363,488 B1 | 3/2002 | Ginter et al. | |
| 6,389,402 B1 | 5/2002 | Ginter et al. | |
| 6,427,140 B1 | 7/2002 | Ginter et al. | |
| 6,449,367 B2 | 9/2002 | Van Wie et al. | |
| 6,463,538 B1 | 10/2002 | Elteto | |
| 6,546,554 B1 | 4/2003 | Schmidt et al. | |
| 6,618,484 B1 | 9/2003 | Van Wie et al. | |
| 6,735,699 B1 * | 5/2004 | Sasaki et al. | 726/28 |
| 6,792,048 B1 * | 9/2004 | Lee et al. | 375/240.26 |
| 6,829,758 B1 | 12/2004 | Lewontin et al. | |
| 6,847,948 B1 | 1/2005 | Paolini et al. | |
| 6,859,879 B2 | 2/2005 | Henn et al. | |
| 6,865,550 B1 * | 3/2005 | Cok | 705/51 |
| 6,889,211 B1 * | 5/2005 | Yoshiura et al. | 705/58 |
| 6,898,800 B2 * | 5/2005 | Son et al. | 725/93 |
| 6,993,664 B2 * | 1/2006 | Padole et al. | 705/59 |
| 7,006,661 B2 | 2/2006 | Miller et al. | |
| 7,092,008 B1 * | 8/2006 | Bernard et al. | 348/180 |
| 7,120,251 B1 * | 10/2006 | Kawada et al. | 380/201 |
| 7,142,691 B2 * | 11/2006 | Levy | 382/100 |
| 7,149,792 B1 * | 12/2006 | Hansen et al. | 709/220 |
| 7,171,693 B2 | 1/2007 | Tucker et al. | |
| 7,209,892 B1 | 4/2007 | Galuten et al. | |
| 7,283,683 B1 * | 10/2007 | Nakamura et al. | 382/274 |
| 2001/0026618 A1 | 10/2001 | Van Wie et al. | |
| 2001/0042043 A1 | 11/2001 | Shear et al. | |
| 2001/0043784 A1 * | 11/2001 | Shirata et al. | 386/21 |
| 2002/0001383 A1 | 1/2002 | Kasahara | |
| 2002/0023214 A1 | 2/2002 | Shear et al. | |
| 2002/0048369 A1 | 4/2002 | Ginter et al. | |
| 2002/0049580 A1 * | 4/2002 | Kutaragi et al. | 704/1 |
| 2002/0087891 A1 * | 7/2002 | Little et al. | 713/202 |
| 2002/0112171 A1 | 8/2002 | Ginter et al. | |
| 2002/0138748 A1 | 9/2002 | Hung | |
| 2002/0162104 A1 | 10/2002 | Raike et al. | |
| 2002/0174356 A1 * | 11/2002 | Padole et al. | 713/200 |
| 2003/0023856 A1 | 1/2003 | Horne et al. | |
| 2003/0084003 A1 | 5/2003 | Pinkas et al. | |
| 2003/0088784 A1 | 5/2003 | Ginter et al. | |
| 2003/0163431 A1 | 8/2003 | Ginter et al. | |

FOREIGN PATENT DOCUMENTS

| | | |
|---|---|---|
| WO | WO 94/07204 | 3/1994 |
| WO | WO-9748203 | 12/1997 |
| WO | WO-99/55089 | 10/1999 |
| WO | WO-00/10286 A1 | 2/2000 |
| WO | WO-00/65493 A2 | 11/2000 |
| WO | WO 00/75760 A1 | 12/2000 |
| WO | WO-00/77596 A1 | 12/2000 |
| WO | WO-00/77597 A1 | 12/2000 |
| WO | WO-01/11883 | 2/2001 |
| WO | WO-01/14953 A1 | 3/2001 |
| WO | WO-01/77788 A2 | 10/2001 |
| WO | WO-01/79969 A2 | 10/2001 |
| WO | WO-03/034193 A2 | 4/2003 |
| WO | WO-03/034313 A2 | 4/2003 |

OTHER PUBLICATIONS

John Viega, et al., "Building Secure Software", Addison-Wesley, 2002, p. 413.

Fabien A.P. Petitcolas, et al., "Information Hiding-A Survey", Proceedings of the IEEE 87(7):1062-1078, Jul. 1999.

Ronald L. Rivest, "Chaffing and Winnowing: Confidentiality without Encryption", Mar. 18, 1998, Theory.lcs.mit.edu/~rivest/chaffing.txt.

Mark Stefik, "Trusted Systems", Scientific American (online), Mar. 1997.

David M. Goldschlag, et al., "Beyond Cryptographic Conditional Access", USENIX Workshop on Smartcard Technology, Chicago Illinois, May 10-11, 1999.

Tobe Liebert, "Should we Trust Trusted Systems?", Law Library Resource Xchange, LLC, Feb. 15, 2000.

Gary N. Griswold, "A Method for Protecting Copyright on Networks", Joint Harvard MIT Workshop on Technology Strategies for Protecting Intellectual Property in teh Networked Multimedia Environment, Apr. 1993.

Marc A. Kaplan, "IBM CryptolopesTM, SuperDistribution and Digital Rights Management", www.research.ibm.com/people/k/kaplan, Dec. 30, 1996.

Christian Collberg, et al., "Manufacturing Cheap, Resilient, and Stelthy Opague Constructs", Department of Computer Sciences, The University of Auckland, Auckland, New Zealand (Jan. 1, 1998).

GLOBEtrotter Software Licensing Patents, press release, available at www.globetrotter.com/patents.htm.

Frank Baylin, et al., "Wold Satellite TV and Scrambling Methods", 2nd Edition, Baylin Publications, 1991, pp. 243-244.

Top 5 Secrets to Building a Successful Software Licensing System, found at: www.flexl.com (Nov. 30, 1989).

Christian Collberg et al., "A Taxonomy of Obfuscating Transformations", Technical Report #148, Department of Computer Sciences, The University of Auckland, Auckland, New Zealand (Jul. 1997).

J.R. Nickerson, et al., "Tamper Resistant Software: Extending Trust into a Hostile Environment", Cloakware Corporation, presented at: Multimedia and Security Workshop at ACM Multimedia 201, Multimedia at the Dawn of the Millenium, Ottawa, Ont. Canada, Oct. 5, 2001.

Israel Office Action dated Dec. 19, 2007.

Examination Report dated Sep. 11, 2008 of European Application No. 02700544.6.

Dec. 6, 2010 Office Communication in connection with prosecution of EP 10 01 0130.2.

* cited by examiner

DIGITAL RIGHTS MANAGEMENT SYSTEM AND METHOD

CROSS REFERENCE TO PRIOR APPLICATIONS

The present application is a divisional application of U.S. application Ser. No. 10/472,286, filed Dec. 11, 2003, which is the U.S. National Phase application under 35 U.S.C. §371 of International Application No. PCT/IL02/00137, filed on Feb. 21, 2002, and claims the benefit of U.S. Provisional Application No. 60/279,889, filed on Mar. 28, 2001, and U.S. Provisional Application No. 60/338,279, filed on Dec. 4, 2001 all of which are incorporated by reference herein. The International Application published in English on Oct. 10, 2002 as WO 02/079955 under PCT Article 21(2).

FIELD OF THE INVENTION

The present invention relates to a system and a method for digital rights management, and in particular, to such a system and method for variable protection of digital content.

BACKGROUND OF THE INVENTION

Digital content can easily and efficiently be delivered through any type of suitable network, such as a cable network, satellite and/or a computer network. Frequently, digital content is broadcast or multicast to many end users over the network. Optionally, digital content can also be efficiently delivered to individual users upon request.

However, in order for digital content to be effectively delivered to users in the context of usage rights or a commerce system, a number of mechanisms need to be provided. In particular, the digital content should be secure against theft, such that only authorized users can retrieve and consume the digital content. Furthermore, access to the digital content needs to be controlled, both against unauthorized use and also optionally to permit access to be linked to other mechanisms, such as payment schemes for example. Other types of control may include determination of an expiration time and date, limitations on the number of displays, and so forth. Such control of the access to the digital content may be generally described as digital rights management.

Failure to protect "Digital Rights" is more damaging than infringement of the same rights when applied to older, "analog" content. The reason is that older forms of content storage and transmission are subject to "generational degradation", where each processing step decreases the quality of the next generation of the product. Digital systems do not, in the main, suffer from such generational degradation. Pirated content may therefore offer exactly the same quality as original material, such that unauthorized users may more effectively infringe digital rights with copied material.

The term "digital rights management" may optionally cover a multitude of rights, which are granted to authorized users. These rights are defined according to a plurality of rules, which regulate the circumstances under which a user is authorized to access the content. These rights may include viewing the content, storing the content, reproduction of the content, excerpting portions of the content, modifying the content, copyrights, access/usage rights, resell/transferring and so forth. These rights may be divided into a number of different phases including specification, packaging (binding the rights to content), delivery, and enforcement in the consumption environment.

Even an authorized user may have only a portion of these rights; for example, the user may be authorized to view and store the content, but not reproduce or modify the content.

In order to prevent unauthorized users from abusing these usage rights, and/or to prevent authorized users from unauthorized use of the rights, the digital content should be protected by some type of security mechanism. Examples of security mechanisms include, but are not limited to, encryption and scrambling of the content. U.S. Pat. Nos. 5,282,249 and 5,481,609 to Cohen et al., which are hereby incorporated by reference as if fully set forth herein, disclose one exemplary system, which enables secure content to be broadcast widely, yet only to be played back or otherwise displayed by authorized users. This signal could contain a television program for example. The signal is scrambled, such that the authorized users are able to unscramble the signal and play back or otherwise display the media content only with the proper security device, such as a smart card for example. Thus, widely received media content is still protected from access by unauthorized users.

Another example of such a security mechanism is described in published European Patent Application No. EP 0858184 and corresponding U.S. Pat. No. 6,178,242 to Tsuria, which disclose a digital recording protection system and which are hereby incorporated by reference as if fully set forth herein. The disclosed system enables the digital content to be sent in a scrambled format, such that the digital content cannot be read and/or displayed without a key. The key is obtained from a control message, which is only sent to authorized users. Preferably, the key is obtained from coded information contained within the Entitlement Control Message, or ECM, for generating a code word associated with the ECM. Thus, only authorized users are able to correctly read and/or display the digital content.

In addition, the system and method described in European Patent Application No. EP 0858184 enable the authorized user to record and playback or otherwise display the digital content, while preventing the user from producing and distributing multiple playable copies of the digital content to other, non-authorized users. Therefore, the authorized user is able to fully use and enjoy the digital content, while the content itself is still protected from unauthorized use.

Unfortunately, the above exemplary systems, as well as other currently available systems, are still at least potentially vulnerable to a concerted attack by "hackers". Their general method is to become an authorized user, therefore gaining access to a working client of the DRM system. Using the open nature of the client platform (for example, the Intel™ IA32 family of hardware and compatible hardware, Microsoft Windows™ operating system) obtain enough information about the working of the DRM system to be able to create a "hack". The hack is distributed to any number of unauthorized users, enabling them to have access to the content without compensating its rightful owners. The key to the hacker's attack is therefore the ability to create an "untrusted" client, who actually has internal (granted) ability to play back the digital content, as opposed to the assumption made by most cryptographic and other security models, which is that attacks on secured content are made by non-clients.

The number of hackers capable of obtaining, understanding and subverting ("reverse engineering") the working information of a DRM system is large, but is insignificant compared to the potential audience for valuable content. Hence, it is the combination of the existence of a hack and the ability to distribute it which constitutes a monetary threat to the owners of digital rights.

Computer network distribution modes are most threatening, since they enable zero-cost, "instant", worldwide reach. At the same time Internet distribution is subject to bandwidth limitations, especially in the upward direction of asymmetric networks such as ADSL, satellite and cable. There are at least two separate cases of hacking to be considered: redistribution of unprotected or clear content, or distribution of software and/or data for facilitating unauthorized use of the protected content.

Some kinds of content—for example, MP3-coded audio—are sufficiently small so that they may be feasibly redistributed through such current technology channels. Thus, most of the present rampant music piracy occurs through redistribution ("sharing") of MP3-compressed music originally distributed digitally on CD's. The technical enabler to ubiquitous piracy is "ripping" software that grabs the digital audio and compresses it to a manageable size, and also provides the redistribution of corresponding player software (and hardware). For example, the "hack" may be the freely distributed, easy-to-use "ripping" software.

Valuable video content (for example, high-quality movie) is typically much larger in size than audio, even when compressed. Although at present there is a lower likelihood of digital video redistribution through the Internet, a different hack distribution mode is more likely to appear once the availability of broadband and/or other large bandwidth "pipes" becomes widespread. That mode involves widespread distribution of a relatively small package that enables an unauthorized client to access the content from its original source distribution. Depending on the DRM system and on the hacker's capabilities that package may contain descrambling keys for the content, modified player software, a "patch" that modifies the original software, a forged license identifying the client as a legitimate one, or a "spoof" that tricks the DRM software to accept the unauthorized client as authorized. Similar hack packages may enable legitimate users, or at least users with some authorization to access the content, to extend their rights to the content in an unauthorized manner (for example, permanently storing, and then viewing multiple times, a movie to which access has been rented for a single showing).

Given the ability of hackers to grab content and to redistribute this content through computerized networks, various security mechanisms have been proposed for protecting the distribution of content through such networks. An example of security which protects the content for distribution through computerized networks features software envelopes, which protect the content (G. Griswold, "A Method for Protecting Copyright on Networks", http://www.cni.org/docs/ima.ip-workshop/Griswold.html as of Nov. 14, 2000). The software envelope determines if a user is authorized, and will only decrypt the content for display, print or copying if such authorization is approved. The content is distributed with the software envelope as a wrapper. Similarly, the Cryptolopes™ concept (IBM Corp., USA) concerns providing a portable wrapper for encrypted content, which includes terms and conditions for accessing the content within the wrapper. Again, only authorized users would be allowed to access the encrypted content. According to another variation of this concept, the parts of the encryption key may also be encrypted and incorporated within the wrapper, as disclosed in U.S. Pat. No. 5,673,316 to Auerbach et al.

Information hiding may be used to add hidden watermarks to data, or even to block unauthorized reproduction, for example in combination with a software program for accessing the data, which is able to detect an unauthorized copy through these watermarks. Steganography concerns hiding the data to be protected itself, typically within other data. Various methods are known for hiding information (see for example "Information Hiding—A Survey", Proceedings of the IEEE, vol 87, p 1062-1078, July 1999). The authorized user is able to select the information of interest from the surrounding noise, or data which is not of interest.

Current implementations of encryption or information "hiding" are not completely suitable for protecting data and/or software code against untrusted client attacks. Encryption is mainly designed for protection of actual transmission of the content, rather than for protection against access by untrusted clients, who can watch every step of the decryption process, extract keys etc. Attempts are made to obfuscate the client software so to make understanding of such software more difficult, and various measures are taken to prevent use of debugging tools such as CompuWare NuMega SoftIce™. However all such attempts have currently failed to achieve the desired protection, mainly due to the open nature of the hardware and software platforms, and the availability of diverse software tools designed to allow debugging of complex programs, and hence of reverse engineering. More than that, the effectiveness of conventional obfuscation schemes is often reduced by the efficiency of modern commercial tools such as the IDA disassembler from DataRescue™, and—once a given obfuscation method is understood—hackers are often able to build special-purpose software tools to assist in defeating it.

PCT Application No. WO 00/77597 of Cloakware Corporation describes a method for protecting software code against tampering and reverse-engineering, by increasing the difficulty of understanding and reverse-engineering the code by observing its execution. The method suffers from the drawbacks of being useful for software code only, and not for content, and also of being suitable for protection only against a particular type of attack.

PCT Application No. WO 00/77596 of Cloakware Corporation describes a method for protecting software code for performing the DES (Digital Encryption Standard) encryption method. DES is characterized by the performance of multiple loops. The disclosed method converts these loops into a directed acyclic graph, which is then further obscured. The directed acyclic graph contains redundant information, which appears to be relevant, and which cannot be easily distinguished from the actual information required to execute the DES encryption method. Also, the cryptographic key itself can be hidden. The disclosed method is suitable for software programs, such as DES, which have one or two strongly distinguishing features: in the case of DES, this feature is the presence of multiple loops. However, the disclosed method is not as generally useful for software programs which lack such features, and certainly would not be useful for general data.

Another attempted solution which is intended for use with software programs is disclosed in U.S. Pat. No. 5,892,899 to Aucsmith et al., which distributes a secret required to operate the program in space and time; obscures the code of the program itself; and isolates particularly sensitive functions for further obfuscation or other types of protection. This attempted solution is less useful for distribution of software code to a large number of users, for example by broadcast through a network, since the key or mechanism to access the obscured code must also be made available to authorized users. This key or access mechanism then becomes vulnerable to unauthorized access and redistribution, as previously described.

Similarly, the protection method for software code which is disclosed in U.S. Pat. No. 5,544,244 to Agura is also vulnerable in terms of unauthorized access to the key. Furthermore, neither of these disclosed methods are suitable for the protection of content.

PCT Application No. WO 01/79969 of Cloakware Corporation discloses a method for protecting general data, by storing data in random actual addresses. These addresses are mapped to virtual addresses, such that the data can be retrieved. Although the method attempts to protect data, in fact it represents a relatively simplistic protection scheme. Furthermore, this protection scheme may be suitable for stored data, but is not suitable for transmitted data, as random storage through a memory or storage device is not effective for data transmission.

The disclosures of all references mentioned above and throughout the present specification are hereby incorporated herein by reference.

SUMMARY OF THE INVENTION

None of the disclosed background art solutions describes or suggests a secure mechanism for variably protecting the digital content. Furthermore, the background art does not teach or suggest varying the protection mechanism according to different categories or instances of content. A significant drawback of background art protection schemes is that once the security mechanism has been compromised, for example by stealing a key, all of the content protected by that precise scheme is vulnerable to access by unauthorized users. Furthermore, depending upon the type of attack, content which is protected by similar schemes may also be vulnerable to unauthorized play back or display. The background art does not teach or suggest solutions to overcome these problems.

Therefore, there is an unmet need for, and it would be highly useful to have, a system and a method for secure digital content delivery, which provides variable security mechanisms for different instances or categories of content, such that reverse engineering the mechanism for playing back or displaying a particular unit, instance or category of content does not necessarily enable the hacker to play back or display other units, instances or categories of content, or at least does not reduce the difficulty of reverse engineering the mechanism for playing back or displaying these other units, instances or categories of content.

The present invention fulfills these needs by providing a system and a method for variable security mechanisms for securing digital content, in which a single non-variable security mechanism is not used for all content. Instead, at least one characteristic or feature of the security mechanism is varied between units, type or categories of content, any of which may be referred to as an "instance" of content. Therefore, even if unauthorized access is gained to a single unit of content, the overall integrity and security of the general system for content distribution is not compromised.

Preferably, security is provided through a general mechanism, which is then varied in order to provide variable, dissimilar security schemes for different instances of content. By "instances of content", it is meant any of a single unit of content, a single type of content or a single category of content. For example, for a category of content, the content may be characterized according to the identity of the content itself, such as the title of a movie for example, and/or according to the owner of a particular copy of the content. A type of content may be audio or video data, for example. Thus, different security schemes may optionally and preferably be generated from a particular root structure for different instances of content.

According to a preferred embodiment of the present invention, content which includes video data is protected through the use of a very large key or other information which is required for reading or otherwise interacting with the protected content. More preferably, this key is the size of the content itself. Redistributing the key is therefore difficult, as it requires similar amounts of bandwidth as distributing the content itself. Therefore, the key is preferably generated at an end user device which is authorized to access the protected content. Preferably, the variable security scheme according to the present invention allows different or otherwise variable mechanisms for generating the key to be used at the end user device, thereby protecting the key generating mechanism from unauthorized access. Most preferably, the key is at least partially generated according to information contained within the protected content itself, such that both the content and the key are most preferably available to the end user device for operating the key generating mechanism, and hence for accessing the content.

As technically it is virtually impossible to absolutely protect content from being hacked, without wishing to be limited to a single hypothesis, the present invention aims to achieve a high degree of system immunity against repeated hacks and also to provide sustainable secure content delivery and digital rights management by combining technical and psychological factors.

By implementing mechanisms by which obfuscation and debug protection are randomly and automatically applied, and incorporating them in a DRM system which proactively varies its apparent scheme, the present invention protects each piece of content by a scheme which, from the hacker's viewpoint, appears to be new and different for each such piece of content. With each such scheme being hard enough to defeat, and a "zero learning curve", a typical hacker—especially in the context of no-profit hack distribution—is likely to give up, realizing the Sisyphean labor involved.

It should be noted that until "up to the eyeballs" hardware protection can be realized, content grab may be possible, making it the easiest hack (or means to gain unauthorized access to the content). The real protection from free network distribution of grabbed material is in bandwidth limitations making distribution of high-quality video files impractical. The next "easy" hack method is capture and distribution of the descrambling key (so-called "McCormac Hack", first suggested for pay TV by John McCormac (see Frank Baylin, Richard Maddox and John McCormac, World Satellite TV and Scrambling Methods, $2^{nd}$ edition, Baylin Publications 1991, pp. 243-244)). The present invention, in preferred embodiments thereof, therefore incorporates content scrambling by means of a key that is essentially of similar size to the content itself. Thus, the same barrier would apply to both content distribution and key distribution.

In addition, the present invention, in preferred embodiments thereof, incorporates the concept that mathematics-based obfuscations (such as these described in "A Taxonomy of Obfuscating Transformations" (Collberg et al., Technical Report #148, Department of Computer Science, University of Auckland, Auckland, New Zealand)) may not be fully effective by themselves against hackers, especially against those hackers who are able to build software tools to assist the reverse engineering process. The present invention, in preferred embodiments thereof, thus features a plurality of possible techniques—in both prototype (base) software and obfuscation transformations—that are "hacker-model based".

The background teachings provide for protected content, which is readable according to a license, such that the license acts or is used as a key. According to a preferred embodiment of the present invention, the problem which is solved is to increase the efficacy and the security of the protected content by intimately connecting the content to the license and/or other types of information, wherein the information is used to construct a variable security scheme.

Hereinafter, the term "random" includes both truly random and pseudo-random. Hereinafter, the term "variable" also includes renewable and mutable (changeable).

Hereinafter, the terms "file", "portion" or "item", with regard to digital content, are used interchangeably and refer to any unit of data for such digital content, whether as a functional unit such as a packet for example, or as a conceptual unit such as a television program for example.

Hereinafter, the term "read" refers to executing, consuming, playing back, displaying or otherwise interacting with or accessing content and/or code according to the present invention.

Hereinafter, the term "display" refers to any type of playback or playing out of media content data for a user, including but not limited to, the audible production of audio data and the visible production of video data, and combinations thereof.

Hereinafter, the term "computational device" includes any type of digital instrument which is capable of operating a software program.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, such higher order languages (HOL) as C and C++ for example, as well as languages such as x86 Assembly for example.

In addition, the present invention could be implemented as software, firmware or hardware, or as a combination thereof. For any of these implementations, the functions performed by the method could be described as a plurality of instructions performed by a data processor.

Hereinafter, "Applied Cryptography" by Bruce Schneier, John Wiley 2nd ed. 1996, and "Handbook of Applied Cryptography", CRC Press, A. J. Menezes, P. C. Oorschot, S. A. Vanstone (pp 195-201) are hereby incorporated by reference as if fully set forth herein, for the teachings regarding cryptography and techniques for implementation thereof.

This application claims priority from U.S. Provisional Application 60/338,279 of Chaim Shen-Orr, filed on 4 Dec. 2001, and from U.S. Provisional Application 60/279,889 of Shen-Orr et al., filed on 29 Mar. 2001.

According to a preferred embodiment of the present invention, there is provided a method for protecting digital content, comprising: protecting the content according to a content security scheme to form protected content; constructing a descrambler to read the protected content; and protecting the descrambler according to a variable descrambler security scheme to produce a protected descrambler, wherein the variable descrambler security scheme is varied according to at least one variable parameter.

Preferably, the method further comprises: transmitting the protected content and the protected descrambler. Optionally, the protected content and the descrambler are utilized at an end user device, such that the end user device is able to run the descrambler if the end user device is authorized, and such that the end user device is only able to read the protected content through the descrambler. Preferably, reading comprises rendering the protected content in a clear format. Also preferably, reading comprises playing back the protected content through the end user device. More preferably, the descrambler further comprises a player for playing back the protected content.

According to preferred embodiments, the at least one variable parameter is at least partially determined according to a characteristic of the end user device. Preferably, the characteristic includes at least one of a hardware identifier and a software identifier. More preferably, the end user device comprises at least video display hardware and video display software, and wherein determining the at least one variable parameter comprises: processing video data by the video display hardware and the video display software; altering at least a portion of the video data during processing according to a characteristic of at least one of the video display hardware and the video display software to form altered data; and forming the at least one variable parameter based, at least in part, on the altered data.

Most preferably, the video data is contained within a stream of video data for being displayed at the end user device.

Optionally, the end user device is associated with a subscriber, and the at least one variable parameter is at least partially determined according to a characteristic of the end user device. Preferably, a plurality of characteristics of the end user device comprise a subscriber profile, and at least one variable parameter is determined according to the subscriber profile. More preferably, the variable descrambler security scheme includes a license, such that at least the protected descrambler is only accessible according to the license. Most preferably, the license includes a value for the at least one variable parameter.

Also most preferably, the license includes data for operating the variable descrambler security scheme. Also most preferably, the protected descrambler is only executable with the data for operating the variable security scheme, such that the end user device is able to run the protected descrambler with the data.

Optionally and preferably, the license further comprises a restriction for a type of access for reading the protected content.

According to preferred embodiments, the method further comprises: transmitting the protected content, the protected descrambler and a license, wherein the license is required for operating the protected descrambler or reading the protected content, or a combination thereof. Preferably, the license is transmitted before the protected content and the protected descrambler. More preferably, the protected content, the license and the descrambler are utilized at an end user device, such that the end user device is able to run the descrambler if the end user device is authorized by the license, and such that the end user device is only able to read the protected content through the descrambler with the license.

Optionally and more preferably, the at least one variable parameter is at least partially determined according to a characteristic of the end user device, wherein data for identifying the characteristic is contained in the license. Most preferably, the characteristic includes at least one of a hardware identifier and a software identifier.

Optionally, the end user device is associated with a subscriber, and the at least one variable parameter is at least partially determined according to a characteristic of the subscriber, wherein data for identifying the characteristic is contained in the license. More preferably, a plurality of characteristics of the subscriber comprise a subscriber profile, and at least one variable parameter is determined according to the subscriber profile.

According to other preferred embodiments of the present invention, the method further comprises: receiving the protected content and the protected descrambler by the end user device; forming an executable descrambler from the protected descrambler; and reading the protected content with the executable descrambler. More preferably, the protected descrambler comprises a first portion for descrambling the protected descrambler and a second portion for reading the protected content. Most preferably, the descrambler comprises a player portion for playing back the content, the method further comprising: playing back the content.

According to still other preferred embodiments, the at least one variable parameter includes a random component. Also, optionally, the at least one variable parameter is at least partially determined according to a characteristic of the protected content. Optionally, constructing the descrambler further comprises altering at least one portion of the descrambler according to the variable descrambler security scheme. Preferably, the descrambler is constructed of a plurality of modules, such that altering the at least one portion of the descrambler is performed by substituting at least one module according to the variable descrambler security scheme. More preferably, a function of at least one module is required during execution of the descrambler, such that if the at least one module is altered, the descrambler does not execute correctly. Most preferably, the function of the at least one module is as a data source for operating a BSG (byte source generator). Also most preferably, the at least one module is a bit bucket.

Most preferably, altering the portion of the descrambler is performed according to at least one instruction contained in a magazine, such that constructing the descrambler includes selecting the magazine. Most preferably, the magazine is randomly selected.

Optionally, at least one instruction is randomly selected from the magazine for altering at least a portion of the descrambler. More preferably, the magazine includes at least one instruction for obscuring at least a portion of the descrambler. Most preferably, the magazine includes at least one instruction for substituting an inoperative module for at least a portion of the descrambler.

Optionally, constructing the descrambler comprises: receiving a prototype descrambler; and adjusting at least one characteristic of the prototype descrambler to construct the descrambler. Preferably, the prototype descrambler includes at least one meta-directive for forming the descrambler.

Also optionally, wherein constructing the descrambler comprises: producing a high level language code for the descrambler; compiling the high level language code to form machine language code; and altering at least one of the high level language code and the machine language code according to the variable descrambler security scheme.

According to still other preferred embodiments, the protected descrambler and the protected content are transmitted substantially simultaneously. More preferably, the protected descrambler and the protected content are combined to form a single data file for transmission. Most preferably, the protected descrambler and the protected content are interleaved in the single data file.

According to still other preferred embodiments, the protected content is protected according to a variable descrambler security scheme, the variable descrambler security scheme being varied according to a variable parameter. More preferably, the variable parameter includes at least one of the following: a characteristic of an end user device for receiving the protected content; a characteristic of a subscriber associated with the end user device; and a license for controlling ability to read the protected content. Most preferably, the variable security scheme protects each instance of content separately, such that each variable security scheme is varied according to the instance of content. Also most preferably, the instance includes at least one of a unit of content, a type of content and an identity of a recipient of the content.

According to still other preferred embodiments, the protected content is at least partially protected according to a key and wherein a size of the key is at approximately as large as a size of the content. Preferably, the key is at least partially generated according to information contained in the content. More preferably, the key is at least partially generated according to information contained in a license transmitted with the content.

According to another preferred embodiment of the present invention, there is provided protected digital content, produced according to the previously described method.

According to still preferred embodiment of the present invention, there is provided a method for protecting digital content, comprising: providing a general security scheme for protecting the content; varying the general security scheme according to each type of content to form a variable scheme, wherein the general security scheme is varied according to at least one random parameter; and altering at least one characteristic of the content according to the variable scheme to form protected content.

Preferably, the variable scheme is applied only to the protected content. More preferably, the varying the general security scheme according to each type of content to form a variable scheme comprises: constructing a scrambler/descrambler to protect the content; and varying at least a portion of the scrambler/descrambler according to the variable parameter; wherein the at least one characteristic of the content is altered by the scrambler/descrambler.

More preferably, the variable parameter includes at least one of a characteristic of an end user device for receiving the protected content, a characteristic of a subscriber associated with the end user device, and a license for controlling an ability to read the protected content. Also more preferably, the variable security scheme protects each type of content separately, such that each variable security scheme is varied according to the type of content. Most preferably, the type includes at least one of a unit of content, an instance of content and an identity of a recipient of the content.

According to still another preferred embodiment of the present invention, there is provided a system for protecting digital content for transmission, comprising: (a) a compiler for receiving a general security scheme and for varying the general security scheme to form a variable security scheme; (b) a packager for scrambling the content according to the variable security scheme to form scrambled content, wherein the variable security scheme is varied separately for each type of content; and (c) an end user device for receiving the scrambled content and for reading the scrambled content according to at least one authorization.

Preferably, the packager further scrambles a player component for playing back the content, such that the end user device receives both the player component and the scrambled content to be able to play back the content. More preferably, the player component further comprises a descrambling component for descrambling the scrambled content. Most preferably, the player component features a plurality of modules, and the compiler varies at least one module according to the variable security scheme to form the player component. Also most preferably, the end user device further comprises a preinstalled module for at least initiating reading of the scrambled content. Most preferably, the system further comprises (d) a license generator for generating a license, wherein the license is required for reading the scrambled content by the end user device.

Also most preferably, the compiler generates a plurality of different versions of protected compiled code, each version being produced according to the variable security scheme. Most preferably, the variable security scheme comprises a basic code and at least one meta-language directive, wherein the compiler performs at least one transformation to the basic code according to the at least one meta-language directive. Most preferably, the compiler further comprises a pre-compiler for receiving the at least one meta-language directive and for interpreting the at least one meta-language directive for performing the at least one transformation to the basic code. Also more preferably, the compiler further comprises a higher language pre-compiler and a higher language compiler, and a lower level pre-compiler and a lower level compiler, wherein at least one of the higher language pre-compiler and the lower level pre-compiler converts the at least one meta-language directive into a comment.

Preferably, the compiler performs a plurality of transformations to the basic code and wherein the plurality of transformations is performed sequentially for debugging the protected compiled code.

Also preferably, each version is sufficiently variable to provide a zero learning curve for attempting unauthorized execution of the protected compiled code.

Also preferably, the code contains at least one essential algorithm, and the at least one transformation causes the protected compiled code to produce a similar result for each version, such that the similar result is identical for the at least one essential algorithm for each version.

More preferably, the code contains a plurality of algorithms, and at least a portion of the plurality of algorithms is varied in tandem in each version. Most preferably, the compiler receives at least one meta-language directive and interprets the at least one meta-language directive for performing the at least one transformation to the basic code.

According to still another preferred embodiment of the present invention, there is provided a method for protecting a portion of software code, comprising: selecting the portion to be protected; and altering the portion to a non-accessible format, wherein a remainder of the software code is not altered to the non-accessible format, and wherein the portion in the non-accessible format is not removed, such that the remainder of the software code is functional.

Preferably, the software code performs at least a first function at a first stage, and wherein the software code performs at least a second function at a second stage, wherein the at least a first function is altered to the non-accessible format, and wherein the at least a second function is operational at the second stage.

According to yet another preferred embodiment of the present invention, there is provided a method for generating a signature for an end user device, the end user device comprising at least video display hardware and video display software, the method comprising: processing video data by the video display hardware and the video display software; altering at least a portion of the video data during processing according to a characteristic of at least one of the video display hardware and the video display software to form altered data; and forming the signature based, at least in part, on the altered data.

Preferably, the video data is contained within a stream of video data. More preferably, the video data is for being displayed.

According to still another preferred embodiment of the present invention, there is provided a protected digital content package, comprising: (a) digital content protected according to a key, the key being generated according to a variable security scheme for each instance of content; and (b) reading software for reading the digital content at least partially by generating the key, the reading software being protected according to the variable security scheme.

Preferably, the reading software comprises at least a descrambler for descrambling the digital content to a clear format with the key. More preferably, the reading software further comprises a player for playing back the digital content in the clear format. Most preferably, the package further comprises: (c) a license for being used by the reading software for generating the key.

Also most preferably, each component of the package is transmitted separately over a network. Most preferably, the digital content is further protected by being in a non-standard format. Also most preferably, a format of the digital content features a syntax, and wherein the syntax is at least partially varied in the non-standard format.

Optionally, the digital content and the reading software are interleaved in a package.

According to yet another preferred embodiment of the present invention, there is provided a compiler for protecting code, comprising a compiler for generating a plurality of different versions of protected compiled code, each version being produced according to a security scheme being received by the compiler.

Preferably, the security scheme comprises a basic code and at least one meta-language directive, wherein the compiler performs at least one transformation to the basic code according to the at least one meta-language directive.

More preferably, the compiler further comprises a pre-compiler for receiving the at least one meta-language directive and for interpreting the at least one meta-language directive for performing the at least one transformation to the basic code.

Most preferably, the compiler further comprises a higher language pre-compiler and a higher language compiler, and a lower level pre-compiler and a lower level compiler, wherein at least one of the higher language pre-compiler and the lower level pre-compiler converts the at least one meta-language directive into a comment.

Also most preferably, the compiler performs a plurality of transformations to the basic code and wherein the plurality of transformations is performed sequentially for debugging the protected compiled code.

Optionally, each version is sufficiently variable to provide a zero learning curve for attempting unauthorized access to the protected compiled code.

Also optionally, the code contains at least one essential algorithm, and the at least one transformation causes the protected compiled code to produce a similar result for each version, such that the similar result is identical for the at least one essential algorithm for each version.

More preferably, the code contains a plurality of algorithms, and at least a portion of the plurality of algorithms is varied in tandem in each version.

Optionally, the basic code is a skeletal code, such that the at least one meta-language directive provides data for completing the skeletal code to form functional code.

According to still another preferred embodiment of the present invention, there is provided, in a system for transmitting protected content, the system comprising a builder and a head-end, the head-end transmitting the protected content, a method for protecting the content, the method comprising: protecting a descrambler to read the protected content according to a variable descrambler security scheme to produce a protected descrambler, wherein the variable descrambler security scheme is varied according to at least one variable parameter, by the builder; protecting the content according to a content security scheme to form protected content by the head-end; and packaging the protected content and the protected descrambler by the head-end for transmission.

Preferably, packaging the protected content and the protected descrambler comprises interleaving the protected content and the protected descrambler.

More preferably, packaging the protected content and the protected descrambler comprises packaging the protected content with information for downloading at least a portion of the protected descrambler.

According to still another preferred embodiment of the present invention, there is provided an improvement for a method for protecting software code, the method protecting the software code by obfuscating at least a portion of the software code, the improvement comprising providing a plurality of magazines, each magazine comprising at least one instruction for obfuscating at least the portion of the software code, such that a plurality of versions of the software code is produced according to the plurality of magazines.

Preferably, the plurality of versions of the software code is varied according to the plurality of magazines for causing a zero learning curve for access by an unauthorized user.

More preferably, the plurality of magazines is provided to a compiler, such that the compiler produces the plurality of versions of the software code.

Most preferably, the software code features a plurality of random algorithms, and wherein the plurality of magazines contains at least one instruction for varying the plurality of random algorithms in tandem.

According to another preferred embodiment, there is provided protected digital content, comprising digital content intimately connected to both information and software code required for accessing the digital content, wherein the connection is formed according to a variable security scheme.

Preferably, the information comprises a license for determining access.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
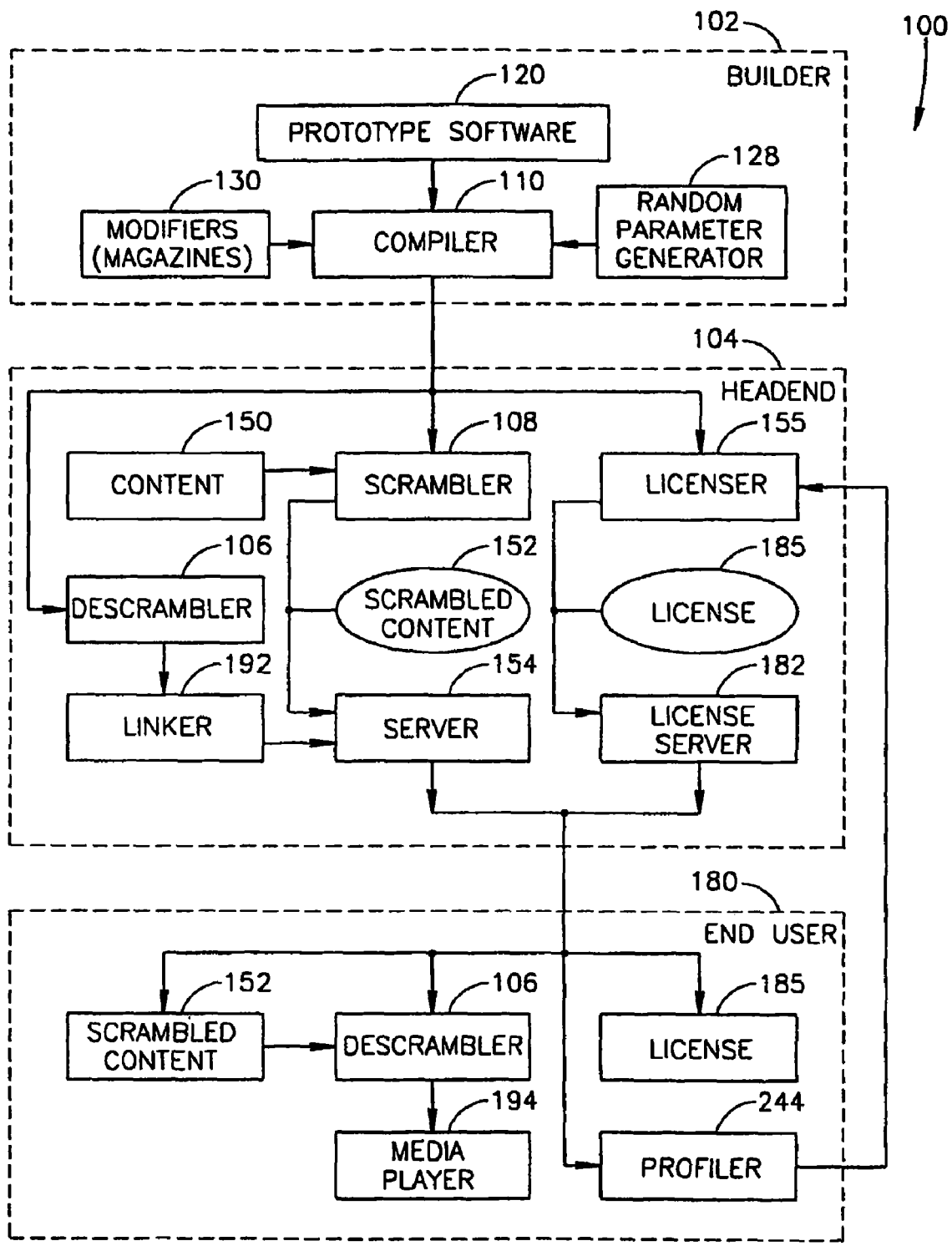
FIG. 1 is a schematic block diagram of a system according to a preferred embodiment of the present invention for secure and yet variable delivery of digital content.

The present invention, in preferred embodiments thereof, comprises a system and a method for providing variable security mechanisms for securing digital content, in which more than one security mechanism is used for different instances of content. At least one characteristic or feature of the security mechanism is varied between units, instances or categories of content. Therefore, even if unauthorized access is gained to a single unit of content, the overall integrity and security of the general or overall system for content distribution and authorized consumption enforcement is not compromised. Preferably, security is provided through a general mechanism, which is then varied in order to provide variable, dissimilar security schemes for different instances of content. The phrase "instance of content", as used herein, refers to any of a single unit of content, a single type of content or a single category of content. For example, for a category of content, the content may be characterized according to the identity of the content itself, such as the title of a movie for example, and/or according to the owner of a particular copy of the content. The type of content may optionally be video or audio data, for example. Thus, different security schemes may optionally and preferably be generated from a particular root structure.

These different security schemes are preferably generated by a compiler facility, which automatically, randomly creates separate instances of the security mechanism, called "schemas", from the prototype root security structure. Randomness is preferably assured by providing at least one parameter having a randomly chosen value, or random parameter, to the compiler. The compiler then generates a new variation on the general security scheme, which is itself a new security scheme. This new scheme is then preferably received by a Headend, which protects or otherwise secures the content according to the new security scheme. Optionally, the secured content contains or is otherwise associated with other information, such as license information for example. Alternatively or additionally, such license information is used as part of the new security scheme, in order to integrate all of these different types of information into a scheme which protects the content. The license is preferably sent separately from the other types of data, such as content and code for playing back the content for example, but may alternatively be sent together with these types of data.

Such preferred variable schemes enable the present invention to preferably vary the protection mechanism which is used for digital content, and hence to dynamically alter the mechanism required to read such content. The unauthorized user is therefore confronted with a situation in which previously learned "hacking" methods for a previous protection scheme are not operative, at least in part, with the new varied protection scheme. Thus, a "zero learning curve" is enforced, in which the unauthorized user relearns the mechanism for playing back or displaying the content for each protection scheme without authorization.

According to a preferred embodiment of the present invention, content which includes video data is protected through the use of a very large key or other information which is required for playing back or displaying the protected content. More preferably, this key is the size of the content itself. Redistributing the key is therefore difficult, as it requires similar amounts of bandwidth as distributing the content itself. Therefore, the key is preferably generated at an end user device which is authorized to play back or display the protected content. Preferably, the variable security scheme according to the present invention allows different or otherwise variable mechanisms for generating the key to be used at the end user device, thereby protecting the key generating mechanism from unauthorized reading of the content. Most preferably, the key is at least partially generated according to information contained within the content itself, such that both the content and at least information required to create the key are most preferably available to the end user device for operating the key generating mechanism, and hence for reading the content.

According to preferred embodiments of the present invention, the variability of the security scheme is at least partially provided by protecting the software which is required to read the content through a variable security mechanism. Such reading preferably includes at least one of rendering the content in a clear (non-encrypted or non-scrambled) format for play back, and playing back the clear content. This security mechanism may optionally be the same or different as the mechanism which is used to protect the content. More preferably, the security mechanism which protects the content is combined with the security mechanism which is used to protect the software for reading the content. For example, optionally and more preferably for content which includes video data, the content is protected with a very large key, which is the size of the content itself, and which is most preferably at least partially generated from information contained within the content. The security mechanism which protects the software for reading the content also more preferably at least partially relies upon information which is contained within the content. Optionally and most preferably, at least portions of the software for reading the content is interleaved, or otherwise combined, with the content for transmission to the end user device. The scheme according to which the two sets of data are combined may itself optionally be variable.

According to a preferred embodiment of the present invention, the software is a combined descrambler/player, such that the software is required to both open and to read the content for display, thereby playing back or displaying the content. Thus, if the transmission of the descrambler/player is performed only when the content itself is transmitted, attacks by reverse-engineering may be delayed until the last possible moment before the descrambler/player is used.

Alternatively, the descrambler/player may optionally be sent in advance of the content, but protected according to a variable scheme of the present invention or protected through encryption with a conventional encryption algorithm. The key to that encryption is then more preferably delivered with the content, which is more preferably the last item to be delivered, to prevent onset of reverse engineering attacks until the last possible moment.

According to a preferred embodiment of the present invention, the security mechanism for protecting the content features at least three components: the content itself, the software for reading the content, and a license. The license is preferably required for the correct operation of the software for accessing the content, and may optionally be at least partially based upon, and/or authenticated by, information contained within the end user device, so as to make the license particular to a certain end user device. The license may optionally be broadcast, or alternatively may be delivered separately to each end user device through one-to-one transmission, for example for subscriptions. The license is preferably delivered in advance of the transmission of the protected content, and is more preferably delivered in a protected format, for example through encryption. Also more preferably, the license cannot be used without the software for reading the content is also required to access the license, since the scheme for license interpretation and usage also varies.

The software is preferably delivered next, after the license. The software may optionally be delivered in advance of the delivery of the protected content, but preferably is not delivered too far in advance of delivery of the content, such that a relatively short period of time elapses between delivery of the software and delivery of the content. The protected content itself is preferably delivered last. This delivery order is optional but preferred, as it provides increased convenience for the end user, while also delaying the onset of attack on components of the security scheme.

The compiler preferably operates variable protection or security mechanisms for securing the descrambler/player. The compiler preferably, additionally or alternatively, obfuscates the code of the descrambler/player. Alternatively or additionally, the descrambler/player may optionally be protected with conventional encryption mechanisms, for example in order to protect the descrambler/player for transmission to the end user, particularly for such transmission in advance of the protected content.

For protection of the descrambler/player according to the variable security scheme, preferably at least one or more of transformations and modifying algorithms are applied. More preferably, there are two different classes of such actions, which are more preferably employed in different circumstances. The first class is preferably employed when the exact algorithm employed in the descrambler/player is not important, as long as it is subject to a given set of restrictions. In such locations "essential algorithms" are preferably employed, in which a given "essential" class is specified, and the compiler is free to substitute for it any other member of the class. This type of substitution may create large variations from one instance of the software to another. Typically, the main requirement is that the algorithm produces exactly the same results while encrypting and while decrypting—for example, a given LFSR (linear feedback shift register) setup.

In other locations, sections of code are more preferably transformed into code that appears to be different from the original code (and are most preferably more complicated), but produces exactly the same results. The compiler can automatically identify code sections as transformation candidates, and apply randomly chosen transformations, thus obfuscating the code. A classic (although not necessarily practical) example of such an obfuscation is replacement of the constant "1" by SQRT(SIN(X)2+COS(X)2). Such "random" transformations may optionally be applied to essential algorithms as well.

Examples of various types of obfuscations are found in "A Taxonomy of Obfuscating Transformations" (Collberg et al., Technical Report #148, Department of Computer Science, University of Auckland, Auckland, New Zealand), although of course other types of obfuscating operations or transformations may be used in addition to, or in place of, the examples described. Other examples may also be found in "Manufacturing Cheap, Resilient, and Stealthy Opaque Constructs" (Collberg et al., Department of Computer Science, University of Auckland, Auckland, New Zealand), although again other types of obfuscating operations or transformations may be used in addition to, or in place of, the examples described.

According to optional but preferred embodiments of the present invention, one or more security components which are known in the art may also be included within the security scheme. For example, conventional cryptographic methods, which could easily be selected by one of ordinary skill in the art, may optionally be included in the scheme. Non-limiting examples of appropriate cryptographic mechanisms include encryption of at least a portion of the descrambler/player, in combination with, or in place of, the security scheme described above; application of an asymmetric signature to the descrambler/player; application of a digital signature to the code of the descrambler/player; use of asymmetric signatures and/or one-way functions in licenses. Encryption of the descrambler/player (or at least a portion thereof) may optionally be accomplished by including the keys for decrypting the code (or portion thereof) for the descrambler/player in a header within the corresponding encrypted content. The descrambler/player may optionally be signed with an asymmetric or digital signature, for example in order to detect malicious substitution of a descrambler/player. The use of signatures in licenses also prevents falsification of the license data.

According to another optional but preferred embodiment of the present invention, the content itself is altered from a standard format to a non-standard format. A non-limiting, illustrative example of such an alteration is described with regard to UK Patent Application No. 0120442.9, filed 22 Aug. 2000, and corresponding PCT Patent Application No. PCT/IL01/00801, both of NDS Limited, the disclosures of which are hereby incorporated by reference. Briefly, the content is optionally and preferably altered according to a method for transforming content from a standard form coded in accordance with a standard coding scheme to content in a non-standard form coded in accordance with a non-standard coding scheme. The method is preferably performed by modifying at least one syntax element which is provided as part of the standard coding scheme. Such an alteration produces a non-standard coding scheme. The resultant coded content is therefore encoded in a non-standard form, and therefore requires a non-standard player. A possible implementation of the invention unifies such a non-standard player with protection mechanisms, detection of the client machine profile, and licensing structure, to create a "player" that plays on authorized machines and does not play on non-authorized machines, with the "personalizing" information preferably contained within the license.

Optionally, the "non-standard form" of the coded content may not be converted into a standard form, but instead is preferably rendered directly.

Preferably, the primitives in the non-standard format are identical to the standard schemes, such that only the syntax is non-standard. A typical syntax for digital compression, such as for one of the versions of MPEG (motion picture expert group) format for example, features a plurality of syntactic fields within the bit stream, which are often represented in different ways. Some fields may be represented by fixed length codes and some by variable length codes. Fixed length codes are generally the simplest representation of a given syntactic field. In digital compression schemes a field could represent a simple number value, or something more complicated. For example, in MPEG-2 video, an eight bit fixed length field is used for the start code value. This value profoundly affects the interpretation of the subsequent bit stream. For example, the start code value of hexadecimal 00 corresponds to a picture_start_code with the subsequent bits interpreted as a Picture Header. The start code value of hexadecimal B3 corresponds to the sequence_header_code with the subsequent bits interpreted as a Sequence Header.

The syntax of such a bit stream could optionally and preferably be altered by assigning different, non-standard values to different start codes. For example, and without limiting the generality of the foregoing, the hexadecimal value 00 could be assigned to sequence_header_code, while the hexadecimal value B3 could be assigned to picture_start_code. The effect of such an approach would be to render viewing and/or other rendering of the bit stream on a standard MPEG-2 decoder impossible.

In accordance with a preferred embodiment of the present invention, syntactic translation for fixed length codes could optionally and preferably be performed using static look up tables. Alternatively, more complicated approaches might use algorithmic state machines to create non-static syntactic translations, allowing optimization for reverse-engineering resistant implementations in addition to the more standard criteria of code efficiency.

The principles and operation of the present invention may be better understood with reference to the drawings and the accompanying description.

Referring now to the drawings, FIG. 1 is a schematic block diagram of a system according to the present invention for the generation of secure digital content according to a variable security scheme.

As shown, a system 100 preferably features three components: a builder 102 for building the software for accessing the protected content and which is itself preferably protected; a headend 104 for producing the protected content, and preferably also for packaging the protected content with the software; and an end user device 180 for receiving and playing back the protected content through the received software.

Preferably, builder 102 features a compiler 110 which receives a prototype software 120. Prototype software 120 is optionally only a skeletal software, such that additional material is required for software 120 to be functional. Alternatively, prototype software 120 may be functional but also alterable. Compiler 110 preferably also receives at least one random parameter from a random parameter generator 128. Compiler 110 may also optionally and preferably receive information for obscuring or other altering software 120 from a magazine 130.

Random parameter generator 128 preferably generates a random parameter, or parameter having a randomly chosen/generated value, as input for creating the new instance of the security scheme. Compiler 110 then generates the compiled software according to the new security scheme and according to prototype software 120. Each security scheme is preferably generated separately for each instance of content, which may optionally be a single unit of content, a type of content or a category of content. Optionally, a security scheme may be reused for more than one instance of content, for example if repeated use of the content occurs rarely and/or in unpredictable intervals, although such reuse is not preferred.

According to a preferred embodiment of the present invention, a plurality of magazines 130, in which each magazine 130 preferably provides a type of alteration, addition or deletion, or other change to prototype software 120, which is performed in order to create the compiled software. Each magazine 130 preferably includes some type of obfuscation, such that the final compiled software is preferably obscured in some way for protection of the software from unauthorized execution, as described in greater detail below. Briefly, at least a portion of the software is optionally and preferably altered according to at least one instruction contained in a magazine 130, which is therefore preferably selected. Such selection is optionally random. Additionally or alternatively, at least one instruction is randomly selected from magazine 130 for altering at least a portion of the software. This instruction may optionally obscure at least a portion of the software, and/or may optionally add an inoperative module to at least a portion of the software.

Compiler 110 may also optionally and more preferably be divided into a plurality of components (not shown; see FIG. 4A) as described in greater detail below. Briefly, compiler 110 preferably features a HOL (High-Order Language), such as a C compiler for example, and a lower level compiler, such as an assembler (machine language) compiler for example. The higher language compiler is preferably divided into two parts:

a pre-higher language compiler, provided according to the present invention, and the actual compiler, which may optionally be any such compiler which is known in the art. Similarly, the lower level compiler (for example, Assembler) is preferably divided into two parts: a pre-lower level compiler (pre-assembler, for example), provided according to the present invention, and the actual lower level compiler (Assembler for example), which again may optionally be any such compiler which is known in the art. Additional stages may optionally be implemented with regard to the function of the lower level compiler, for performing one or more operations according to the present invention on the machine code.

Each pre-compiler module is more preferably able to read the meta-language directives which are provided in prototype software 120 and in the transformations, preferably provided from magazine 130. These meta-language directives may optionally direct or control changes to be made and/or code to be inserted, for example from magazines 130 which provide transformations. The pre-compiler module for the higher language compiler may optionally read these meta-language directives directly from prototype software 120. However, the pre-assembler module for the lower level assembler preferably receives its meta directives through the Assembly code generated by the pre-compiler and the compiler.

Thus, these meta-language directives are preferably in a form that is disregarded by the HOL compiler itself, in such a manner that directives are placed in their proper place in the compiler's text output. This form is language-dependent, and may optionally be in the form of specially-marked comments or specially-marked dummy function calls.

The pre-assembler is more preferably constructed to remove any comments etc. whose presence may assist hackers in reverse-engineering the program.

It is preferred that the meta-language directives remain with prototype software 120 as various transformations and/or other operations are performed, for the purposes of debugging. Compiler 110 (and/or an associated component) can then optionally and preferably be used for examining one or more directives if the resultant compiled code is not operational or has some type of operational fault. The transformations are also optionally and more preferably performed in a plurality of successive operations, also in order to support debugging operations.

Optionally and more preferably, the information received by compiler 110 from Magazine 130 may be divided into two types: essential algorithms and random algorithms. Essential algorithms are used in such places where the exact algorithm employed is not important, as long as it is subject to a given set of restrictions. Typically, the main requirement is that the algorithm produces exactly the same results while encrypting and while decrypting. Thus, as a non-limiting example, for fulfillment of the BSG function described below, a "BSG" essential class is specified, which may be fulfilled by many variants of LFSR (linear feedback shift register), RC4 etc., and the compiler is free to substitute for it any member of the appropriate class. This type of substitution may create large variations from one instance of the software to another.

Random transformations are those for which a substitution can optionally be made wherever a given pattern is matched in the program. Thus they have to deliver exactly the same results and side effects as the original pattern code. They fulfill both an obfuscating function and a function of making the instances of the software dissimilar.

One example of an essential algorithm is a BSG (Byte Sequence Generator). The BSG may optionally and more preferably be used to generate a key for protecting the content and/or the code of descrambler 106 (see below). The key may alternatively or additionally be generated through other functions of the compiled software, but is preferably generated through the function of at least one random algorithm. The BSG may optionally be implemented as a feedback shift register, as is known in the art ("Handbook of Applied Cryptography", CRC Press, A. J. Menezes, P. C. Oorschot, S. A. Vanstone (pp 195-201)), with inputs that include one or more of the following items: a license 185 required to access the protected content; a content 150 itself; descrambler 106 itself; auxiliary routines which attempt to detect reverse-engineering activity, such as debugging of descrambler 106 code; one or more identifying parameters for an end user device 180 which is to be used to play back or otherwise display the content; and side effects of the operation of the descrambler 106, such as stack values. These items are described in greater detail below; however, it is important to note that although each item may have an independent function, the data derived from the item can be used as an input to a protective algorithm, which in turn is preferably contained within the compiled, obfuscated software.

The use of a BSG function also enables the code of prototype software 120 and/or descrambler 106 itself to be used to generate the key, as such code may optionally be included within the operation of the function, as described above. Therefore dual use of the software code is possible, and is in fact preferred, as such dual use increases the difficulty of modifying the code in the course of reverse engineering, or in production of pirate versions of the code. Other types of dual use of code/data are also optionally possible for operation with the BSG, including but not limited to, use of one or more of the content data, the code used to create the license and/or the data for the license itself. In any case, the input code/data may optionally and preferably be operated upon by a randomly-modified hash function, whose result is preferably used as part of the binary code of a different portion of descrambler/player code, for example running a portion in parallel. Thus, hacker modification of the first section of code preferably prevents the second section from operating properly.

A more general concept is that of a "Bit Bucket", which itself is not an obfuscation, but a conceptual device for using any piece of information available within the system—content, code, PC characteristics or anything else—to influence a program's operation in a non-transparent (possibly delayed) manner. A BSG, as described, is a typical use of the "bit bucket" concept and may be considered to be a type of obfuscation.

Sources of data which are used for bit buckets and other functions may optionally be varied, as long as either the end result is identical, or at least defined, or alternatively if the variation is performed in tandem with a function that receives the result of the operation on the source of data.

The use of bit buckets is also an optional and illustrative example of a preferred type of obfuscation, which is the use of a delayed effect. The delayed effect causes the outcome of a particular function to be used later in the flow of operation of the code, such that any alteration in that outcome preferably does not have an immediate effect on the function of the code. An alteration in the data which is used to form the bit bucket thus only has an effect after the processing of the bit bucket data, which may optionally be further delayed by performing the processing at a greater functional remove from the actual use of the outcome of that function. Another example is the use of an FSR (feedback shift register) function, described in greater detail below.

Examples of obfuscations which may optionally be performed with either type of algorithm include, but are not limited to, multiple execution paths for a particular function. For this obfuscation, each of a plurality of execution paths achieves the same result, and any path may optionally be randomly selected during the execution of the software. Certain execution paths may optionally and preferably never be reached. Therefore, optionally and more preferably, the "random" selection is in fact weighted, in order for certain paths to be chosen more frequently. This weighting further obscures the function of the software and makes analysis more difficult by increasing the difficulty of guessing which branches are never used ("dead code").

Another example of an optional and suitable type of obfuscation is the removal (or at least minimization) of binary decision points, or "yes/no" decisions, in the flow of operation of the software. Preferably, the output of any function comprises more than two possible outcomes, in order to avoid such binary decisions, as such binary decision points may be vulnerable to unauthorized alteration by setting the outcome to always be positive.

Yet another example of an optional and suitable type of obfuscation is the use of multi-level transformations. These transformations are preferably performed across multiple points in the code, and are varied in tandem. The transformation may optionally also be performed by altering the code at multiple stages in the process of compiling the code.

The resultant compiled software, shown as a descrambler 106 and a scrambler 108, is preferably passed to a headend 104. Descrambler 106 and scrambler 108 are optionally an identical component, or alternatively are two separate software components. Headend 104 preferably transforms content 150 into a protected format, which may optionally be scrambled for example, more preferably by the operation of scrambler 108, generated as previously described. Also as previously described, according to preferred embodiments of the present invention, scrambling is performed with a very large key, which is most preferably the size of content 150 itself. The use of a very large key increases the difficulty of redistributing the key ("McCormac Hack"), particularly through an asymmetric network. The large key may also optionally be generated through a combination of different elements, which are received and combined in order for the protected content to be accessed. In addition or alternatively, an asymmetric key pair may optionally be used to encrypt parts of the content as a part of the generated security scheme.

This very large key may optionally be generated by scrambler 108 itself, or may alternatively be generated by a different mechanism. The input(s) to create such a key may optionally include content 150 itself, descrambler 106 itself, and indeed any other source of data which may optionally be sent to end user device 180. This key itself is preferably not sent to end user device 180, but instead is generated by descrambler 106 according to at least data, and more preferably also software code and license, which is sent to end user device 180, and end user device identifiers which are extracted by descrambler 106.

Scrambler 108 preferably uses the key to scramble content 150 to form scrambled content 152. Although the term "scrambled" is used herein, in fact any type of protection mechanism for protecting the content is envisioned as being within the scope of the present invention. Scrambled content 152 is then more preferably incorporated with descrambler 106 in a single data package. The data package may optionally be formed for example by interleaving or mixing the data, or otherwise combining the data from descrambler 106 and scrambled content 152. Such an embodiment is preferred because it both increases the difficulty of gaining unauthorized access to descrambler 106 and to scrambled content 152, and also because it ensures synchronization between scrambled content 152 and descrambler 106. The data package is then sent to end user device 180, which is in communication with headend 104.

According to preferred embodiments of the present invention, such incorporation is preferably performed through a linker 192. For example, linker 192 may optionally interleave the two different types of data to form the data package, such that execution of descrambler 106 would need to occur from within the data package.

Alternatively, linker 192 may only include information which is required to download the code for descrambler 106 within the data package, for example by including an address or URL to a location from which the code may be obtained, optionally with scrambled content 152. This alternative embodiment may be preferred for streaming media, such as streaming video data for example, as it separates transmission of scrambled content 152 from transmission of descrambler 106.

Headend 104 also optionally and preferably includes a licenser 155 which generates one or more licenses 185. Generated license 185 is optionally implemented as a small data file which is generated according to one or more applicable preconditions. These preconditions may optionally include one or more entitlements, and/or one or more user profile data items. Generated license 185 is preferably required for accessing at least scrambled content 152 by end user device 180. Generated license 185 is preferably generated according to at least one characteristic of the user associated with end user device 180, and/or according to at least one characteristic of end user device 180 itself. Most preferably, if end user device 180 is a computer, the characteristic at least includes the identifier for that particular computer, such as a hardware identifier for example. Therefore, the structure of generated license 185 is preferably different for each instance of content, and hence is preferably different for each newly generated security scheme. In addition, the code portion of the descrambler/player which is required to read and/or verify generated license 185 is preferably also different for each generated security scheme.

Since the structure of generated license 185 preferably changes for each instance of content, generated license 185 may optionally and preferably be transmitted in advance of the data package, or alternatively may be transmitted with the data package, or even embedded within the data package. Generated license 185 is optionally and preferably generated through a license server 182.

As previously described, once end user device 180 receives the data package, end user device 180 starts the playback initiation mechanism. For example, end user device 180 may optionally be required to jump to an appropriate location within the data package in order to start the playback initiation mechanism. Alternatively, if the data package does not include all of the code for descrambler 106, the play-back initiation mechanism may require end user device 180 to download at least a portion of code, for example through an address or URL which is preferably provided as part of the data package. Play-back or display of the content preferably also requires such control tasks as obtaining and verifying licenses, reading one or more additional portions of code of descrambler 106, playing back content, generating messages and reports, and so forth.

Playback or display of the content may also be restricted according to generated license 185, which is preferably received by end user device 180. Preferably, generated license 185 is at least required to read the protected content. Optionally and more preferably, the type of access (playing back) of the content which is permitted is also controlled according to information contained in generated license 185, for example according to one or more rules contained within generated license 185. More preferably, generated license 185 contains information which must combine correctly with corresponding information contained within end user device 180 in order for the protected content to be read by descrambler 106. Illustrative examples of such information include but are not limited to a hard coded identifier within end user device 180 and/or an associated peripheral; hidden unique data which has been placed on non-volatile storage of end user device 180; collected software identifiers, related to one or more software programs on end user device 180; and the operation of identifier and/or secret algorithms, preferably provided through a specialized security device such as a smartcard. Most preferably, a combination of a plurality of these parameters is included within generated license 185.

Information about end user device 180 which is required to use generated license 185 and/or to otherwise identify end user device 180 may optionally and preferably be determined by a profiler 244, as described in greater detail below with regard to FIG. 2.

Although the above description has centered on the concept of descrambler 106 being assumed to be separate from a media player 194, in fact the present invention is also operative with media player 194 being combined with descrambler 106, as a single software unit. For the latter embodiment, the combination may be termed a "descrambler/player".

Figure 2:
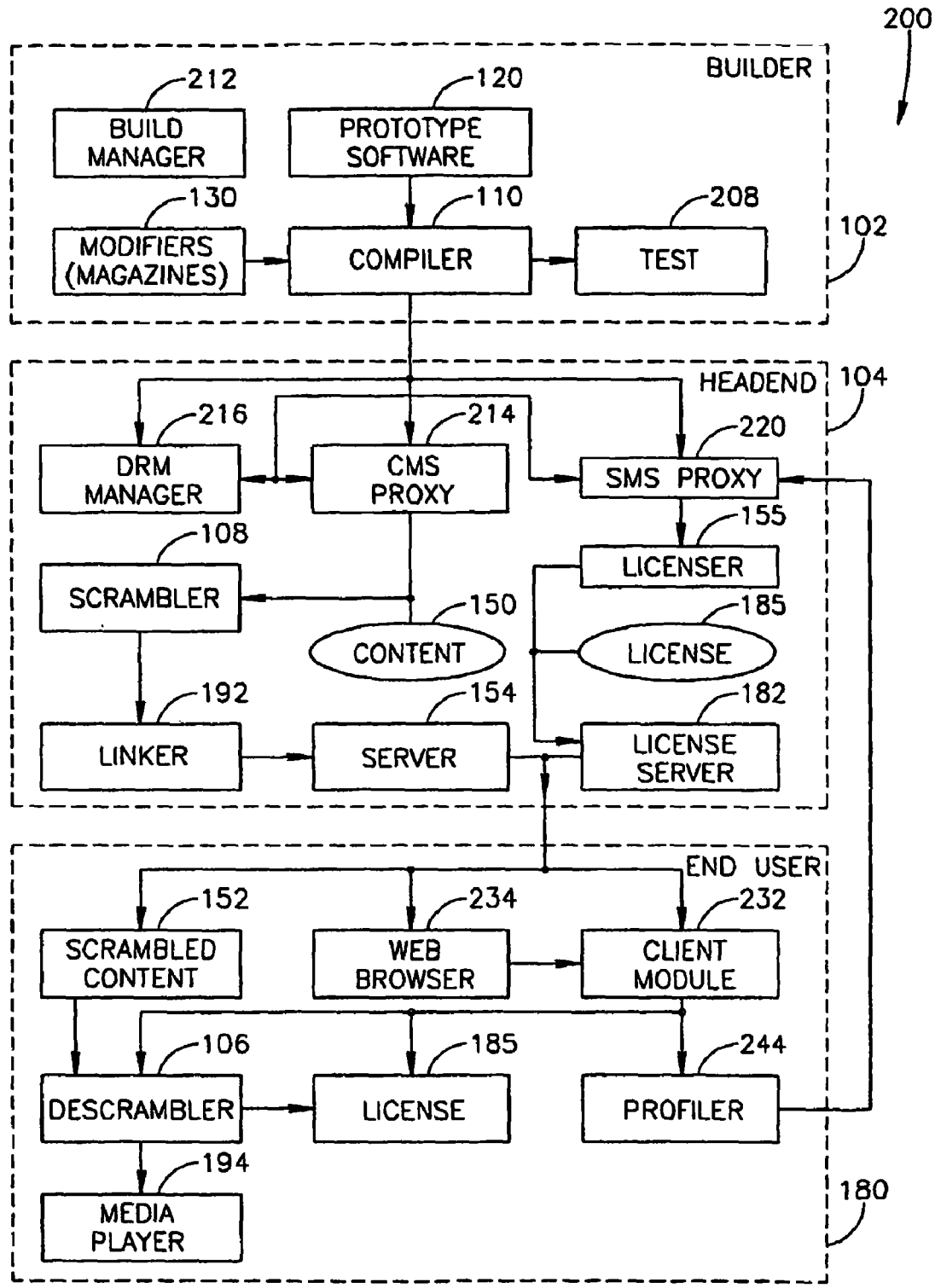
FIG. 2 shows a schematic block diagram of an illustrative implementation of the system of FIG. 1 in greater detail.

FIG. 2 shows a schematic block diagram of an illustrative implementation of the system of FIG. 1 in greater detail. A system 200 is based upon the system of FIG. 1. As shown, builder 102 preferably receives a generalized version of the code of descrambler/player, shown as prototype software 120. Prototype software 120 is preferably at least divisible into a plurality of different components, each of which may then optionally be modified. This prototype version of the code is preferably fed to compiler 110, which then generates the protected version of the code. The protected code may optionally be tested by a tester component 208 before being sent to head-end 104.

Selection of each magazine 130 and/or magazine element for creating the code may optionally be random. Selection of magazine 130 is preferably performed according to a heuristic which calculates the resource load imposed by each magazine 130, and which then optionally rejects a selected magazine 130 if the resource load reaches a maximum permitted level. Illustrative examples of elements which may be included within each magazine 130 include, but are not limited to, use of non-linear or linear Feedback Shift Register algorithms; insertion of feedback at different points in the generation process; use of different functions for accessing the protected content with a key, such as different decryption algorithms for example; replacement of various mathematical operations and/or data with equivalents that generate the same or a similar result; translocation of object code elements within the overall code; and replacement of machine instructions with equivalent instructions that hinder debugging or the use of disassemblers. Examples of these different types of replacements would be obvious to one of ordinary skill in the art, and are also described in the references which were previously incorporated by reference.

Each of the elements of prototype software 120 which is to be varied may then optionally be varied with regard to the operation of compiler 110. For those elements which are to be varied, compiler 110 preferably performs the variations according to the information and/or instructions contained in magazine 130.

For example, magazine 130 may feature one or more instructions for operation of a Byte Sequence Generator (BSG). The BSG function is described above as being useful for generating a key to scramble (or descramble) content. However, the BSG function is also (additionally or alternatively) useful for protecting the code itself. The key is also preferably used to protect the content itself.

The BSG may optionally be implemented as a feedback shift register, as previously described and as is known in the art, with multiple different possible inputs as previously described. The effect of the BSG function is to produce a seemingly random sequence of bits by combining contributions from multiple processes. This sequence cannot be predicted, but can be duplicated exactly if the same generating process is followed. Preferably, each process is provided through the actual operation of a routine of the code of the descrambler/player itself, such that more preferably, operation of a plurality of routines of the code provides the bits required. These one or more routines are therefore preferably protected against modification or alteration, since otherwise the BSG function would not operate correctly.

Another type of functionality, which may be determined by magazine 130 and implemented by compiler 110, is the use of constants for modifying, obscuring and transforming the code of prototype software 120. Such constants may in fact be optionally obtained as blocks of data or bits, which may be used for any purpose. Therefore, the blocks of data or bits may function as a bit bucket, the boundaries of which may be determined according to parameters set by magazine 130.

Still another type of functionality, which may be determined by magazine 130 and implemented by compiler 110, is the provision of one or more defenses against debugging and/or other reverse engineering software programs. Debugging programs are routinely used by software engineers in order to analyze the operation of code at run time, in order to find problems or "bugs". Such programs may also be used by hackers in order to understand the functions of software programs which are to be hacked. Two exemplary types of defenses which may optionally be implemented by the present invention include code protection and code routing. Code protection involves designing the code such that manipulation or patches to the code do not allow the code to be executed, or executed correctly. For example, the same code may be used for dual purposes, both for execution and as input to a bit bucket, as previously described. Any alteration to such code would cause the latter function of the code to be performed incorrectly. Code routing causes the code to appear to be non-deterministic, for example by routing portions of the code, such as jump addresses, to either the content itself or to the license.

For this implementation, the content and/or the license may optionally contain one or more executable instructions, preferably in scrambled form. Preferably, the content and/or the license serve as a data source, for example as a bit bucket, for operating a function such as the BSG, a correct operation of which is more preferably required for the code to be routed correctly.

For example, static debugging programs analyze the bits of an executable, without running the code for the executable, and are aided by using a disassembler program to analyze the input. One example of a defense against static debugging, which may optionally be determined by magazine 130 and which is preferably implemented by compiler 110, is the alteration of the code for the descrambler/player to a form which cannot easily be analyzed, yet which maintains the functions of the code. One non-limiting example of such an alteration is the replacement of a jump by an indexed jump, in which the value for the index is obtained from an external source such as the content itself, the license, or an identifier from end user device 180 or their combination. This value should be easily available to both the code at end user device 180 and to builder 102, yet should not be easily available to the disassembler program.

Other debugging programs use dynamic debugging, which analyzes an executable while the code is actually being operated. Examples of dynamic debugging techniques include, but are not limited to, setting breakpoints for the purpose of stopping the code and then analyzing and/or manipulating it; and single stepping through the code, in which instruction is executed and the result is examined, in order to understand the functions of the code. Illustrative examples of defenses against dynamic debugging, which may optionally be determined by magazine 130 and which are preferably implemented by compiler 110, include but are not limited to, preventing the operation of such programs after detection (for example through the Pentium™ processor four debug registers (Intel Corp, USA; see "IA-32 Intel Architecture Software Developer's Manual, Vol 3: System Programming Guide", USA 2001, chapter 14), which permitted certain types of access to the code during execution without changing the code itself); moving the location of critical actions in memory to remove fixed breakpoints; use of timers to detect timing deviations caused by single stepping through the code; and the use of in-stack and/or in-cache code.

Magazine 130 may also optionally contain one or more instructions for performing code hiding by obfuscating compiler 110. Code hiding is preferably used for the preferred embodiment of the present invention in which the same descrambler/player code is used to decrypt, or otherwise access, both the code for the descrambler/player itself and the protected content as well. Those functions of the code which are required for such access, as well as for operation of the descrambler/player by end user device 180, clearly should be maintained at end user device 180. However, the code may also optionally be used for other functions at builder 102 and/or head-end 104, which functions would not be necessary for accessing and ultimately playing back or otherwise displaying the content at end user device 180. Such functions are preferably not exposed to the user through end user device 180, as such exposure may assist "hacking" of the code and/or protected content. Simply removing the code from the version which is sent to end user device 180 may also cause difficulties, as it may complicate the performance of integrity checks, use of bit buckets and so forth.

Code hiding enables this difficulty to be overcome, by enabling all of the code to be sent to end user device 180, including code for functions which are not used by end user device 180, by altering those portion(s) of code that are not required by end user device 180 to a protected and/or otherwise unusable form. For example, each portion of code which is not required by end user device 180 (non-required code) is preferably encrypted by compiler 110, more preferably as a last stage before the prepared code is sent to head-end 104. The correct key is preferably available only to head-end 104, which optionally and more preferably is replaced by an incorrect or otherwise unusable key for transmission to end user device 180. Thus, the actual portion(s) of encrypted code preferably remain identical at builder 102, headend 104 and end user device 180; even so, access to the functions of the code by end user device 180 is still blocked. Furthermore, the non-functioning portion(s) of code cannot be easily identified at end user device 180 as being "garbage code", as such identification might enable an unauthorized user or hacker to insert patches or other code in those areas.

In addition, each element of the generated descrambler/player code may optionally be static or dynamic. A static element is not varied during operation of the descrambler/player itself, while a dynamic element does vary during actual operation. A static element may optionally feature one or more dynamic parameters, which change their value during operation of the descrambler/player. In addition or alternatively, at least a portion of the code and/or an envelope for containing the code may optionally be self-modifying. Compiler 110 may also optionally encrypt the final code, but preferably such encryption is performed at head-end 104 instead.

In addition, builder 102 preferably features a build manager 212. Build manager 212 may optionally and preferably be used to run multiple stages before and after the operation of compiler 110, more preferably including testing of the resultant compiled code for function and other tests. Build manager 212 also preferably maintains records of the compiled code and/or of the test results for such code.

The prepared code is then preferably sent to headend 104 for transmission to end user device 180. The content may also optionally be sent to head-end 104 in a protected form, but preferably the content is protected by head-end 104. As shown, head-end 104 preferably receives a security scheme for protecting the content from build manager 212. The content itself is preferably received from a content server 214, which may optionally be implemented as a proxy for the actual server (not shown). Availability of the content, and also optionally the determination of one or more characteristics of the user which are required to access the content, are preferably determined by a DRM (digital rights management) manager 216. This information is preferably combined with the content, and is then passed to scrambler 108.

Scrambler 108 preferably protects the content according to the security scheme provided by compiler 110. However, one or more parameters, or values thereof, for protecting the content according to the security scheme may optionally be obtained from a SMS (subscriber management system) server 220. SMS server 220 preferably provides information about the subscribers controlling each end user device 180 and/or about end user device 180 itself. As shown, SMS server 220 may optionally operate in combination with DRM manager 216 to provide the necessary information to scrambler 108; alternatively, SMS server 220 may provide this information directly to scrambler 108.

Scrambler 108 preferably uses the information to protect at least the content according to the security scheme. More preferably, scrambler 108 also interleaves, mixes or otherwise combines the protected code, received from builder 102, with the protected content, as previously described.

Preferably, the information provided by SMS server 220 includes at least the information required for creating the license, such that the information is passed from SMS server 220 to licenser 155, at least with regard to subscriber and/or end user device data.

Licenser 155 preferably then creates a license which incorporates the subscriber and/or end user device profile information and which is preferably required for accessing the content by end user device 180, as previously described. The license may optionally be transmitted with the protected content by server 154, or alternatively and preferably is transmitted by separate license server 182.

Server 154 preferably transmits at least the protected content, more preferably in combination with the protected code, from head-end 104 to end user device 180. If the protected content is not combined with the protected code by scrambler 108, and/or if additional formatting and/or packaging are required, server 154 preferably receives the packaged data from linker 192, rather than receiving the data directly from scrambler 108. Server 154 may also optionally receive profile information from a profiler 244, for example concerning the features and/or characteristics of end user device 180. The complete, packaged data, including the protected descrambler/player code and the protected content, is then transmitted from head-end 104 to end user device 180.

End user device 180 preferably receives both the protected code and content, and must then access both the code and content in order to be able to play back or otherwise access the content. Optionally, end user device 180 only receives the protected content, but preferably both the code and content are received by end user device 180, more preferably simultaneously or substantially simultaneously. As shown, end user device 180 preferably features at least one pre-installed client module 232, which may optionally be implemented as a "plug-in" or addition to a Web browser 234. Pre-installed client module 232 is preferably able to initiate the mechanism for accessing the protected code and content, thereby enabling the protected code to actually decrypt or unscramble itself, or otherwise render itself in an accessible format, to form an installed descrambler 106 at end user device 180.

Installed descrambler 106 is then preferably able to unpack the remaining data, to extract scrambled content 152 and license 185. Next, installed descrambler 106 preferably reads the license information from license 185, and more preferably uses this information to access the code for media player 194 and to unprotect the protected content. Media player 194 is then preferably operative to play back or otherwise display the content.

Profiler 244 preferably operates at least once at each end user device 180 in order to create a profile, containing information about that end user device 180. This profile is then preferably returned to headend 104 for descrambling and storage at SMS server 220. Profiler 244 may optionally contain one or more code sections taken from descrambler 106, and is similarly produced by the same compiler setup.

As previously described, such profile information may optionally be derived from any hardware and/or software characteristic of end user device 180, such as a hardware identifier, software identifier, and so forth. At least some of the profile information is then preferably used by licenser 155 to generate license 185 to be sent to end user device 180. Also as previously described, such a process of comparing information may optionally be performed by using the profile information as input to one or more functions of scrambler 108 and descrambler 106, without which the relevant code within descrambler 106 is inoperative and/or does not operate correctly.

Figure 3:
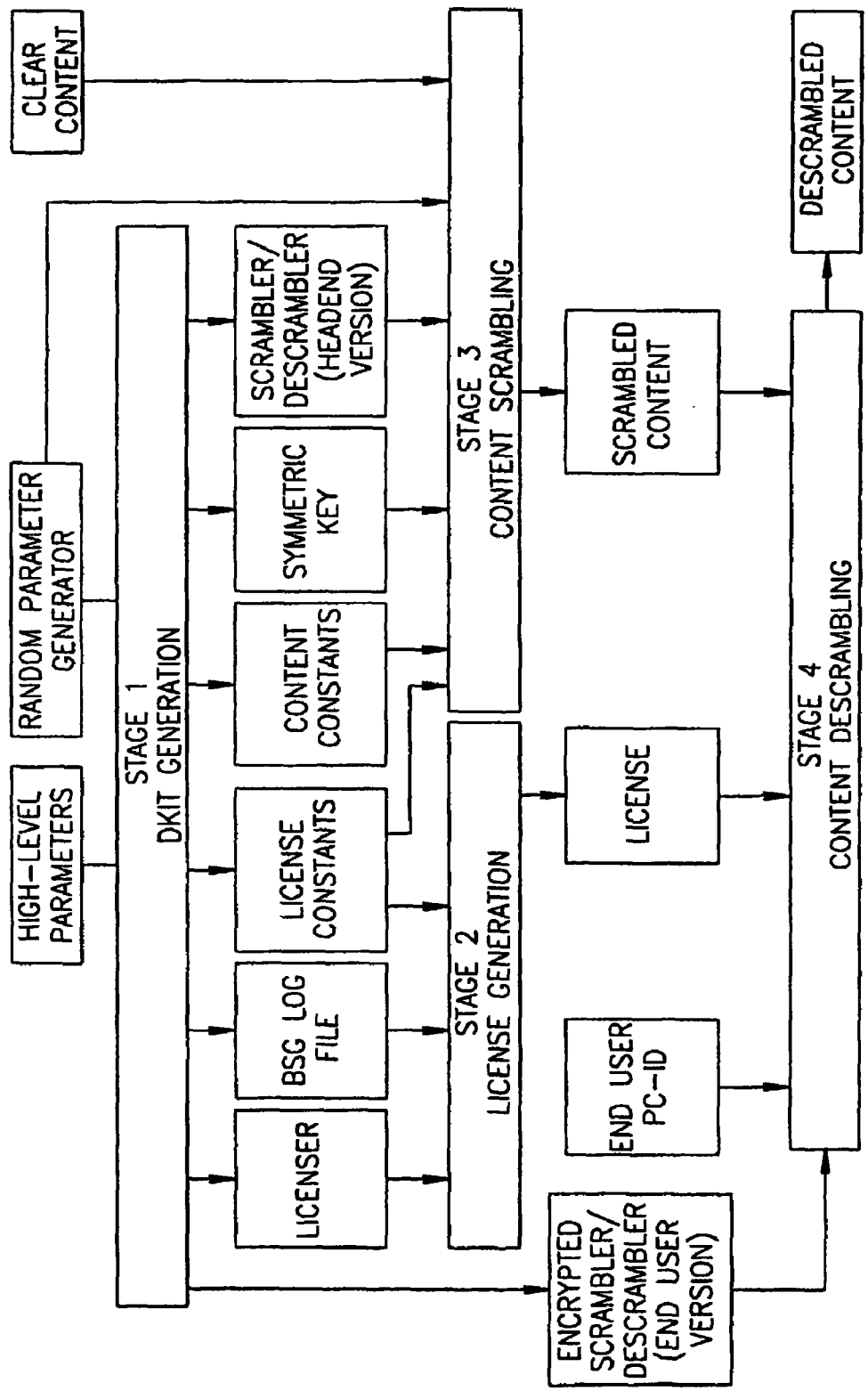
FIG. 3 is a flowchart of an exemplary overall method for generating the protected code and content according to the present invention.

FIG. 3 is a flowchart of an exemplary overall method for generating the protected code and content according to the present invention. As shown, the variable security scheme is generated for protecting at least the content in stage 1. Preferably, the security scheme for protecting the descrambler/player code is also generated at this stage. One or both schemes are preferably generated automatically and randomly, optionally with one or more high level parameters, such as allowed increase in delivered content size, allowed increase in processing load, and content delivery mode (file/streaming). The output of this stage more preferably includes license constants (information for generating the license), parameters related to protecting the content, and the security scheme(s) for protecting the content and/or descrambler/player code. Most preferably, the protected code of the descrambler/player is also generated.

Stage 2 is preferably performed at the head-end, and includes license generation from the license information. Stage 3 is also preferably performed at the head-end, and includes protection of the content, for example through scrambling or encryption of the content. The protected content, preferably with the protected descrambler/player code, and more preferably also with the license, is then sent to the end user device.

Stage 4 is performed at the end user device, and includes all procedures necessary to play back or display the content. Preferably, this stage includes executing the protected code (optionally and more preferably including the optional portion that obtains the identifying information from the end user device) and then reading the protected content.

Figure 4A:
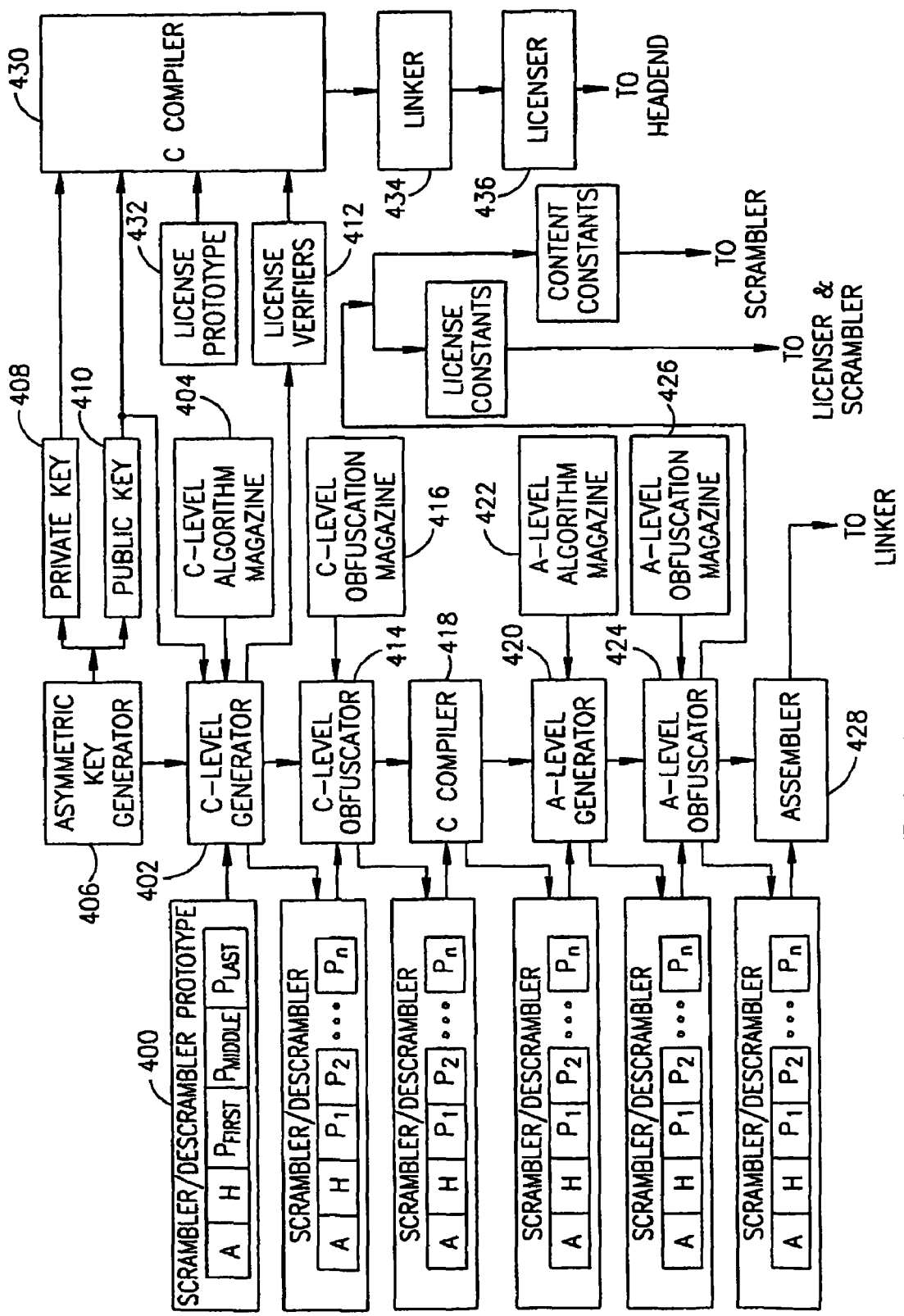
FIGS. 4A and 4B, taken together, comprise a flow diagram of exemplary methods for generating the protected code according to the present invention.
Figure 4B:
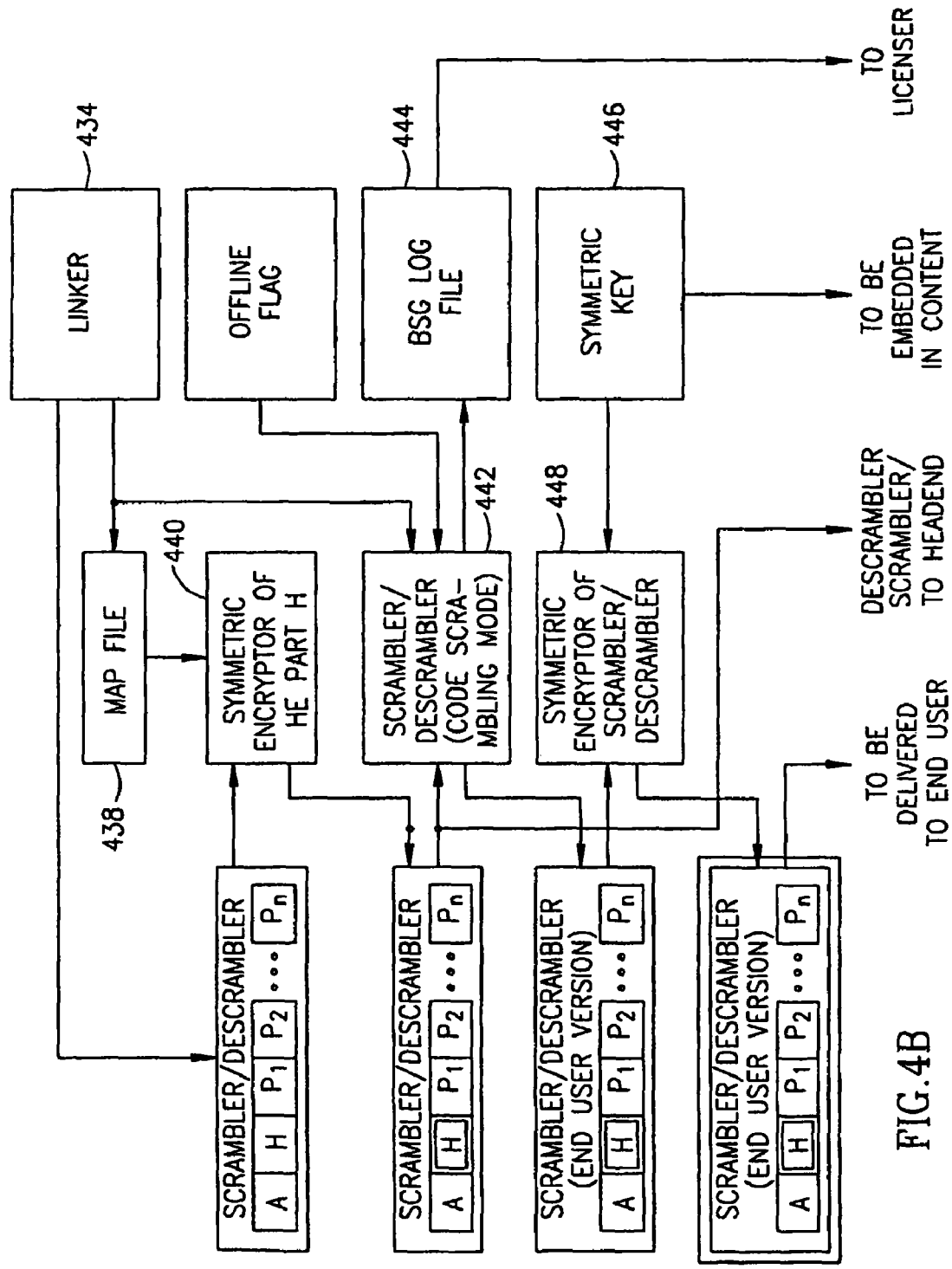

FIG. 4 is a flow diagram of the stages required to perform stage 1 of FIG. 3, for creating the protected code and the security scheme for protecting the content. The flow diagram is divided into two diagrams, FIGS. 4A and 4B, for the sake of clarity only and without any intention of being limiting. As shown with regard to FIG. 4A, the flow receives a number of different inputs. These include a scrambler/descrambler/player prototype software code 400, which preferably includes at least code for performing the encryption and decryption, or scrambling and descrambling, functions. Prototype software code 400 preferably includes meta-language directives, which are instructions for creating the actual code. These meta-language directives preferably direct the randomization and/or obfuscation at particular locations within the code.

Prototype software code 400 is fed to a C-level generator 402, which interprets the meta-language directives in order to modify the actual program language code. C-level generator 402 preferably also receives a magazine from a magazine generator 404. As previously described, the magazine also contains instructions for modifying the code in order to create the variable security scheme for protecting the code. For example, C-level generator 402 may optionally insert a call to a suitable, randomly selected essential algorithm routine according to instructions in the magazine. For example, if a BSG routine is required, then the selected algorithm is selected from a group of such routines.

Optionally and more preferably, C-level generator 402 also receives a public key 410 from asymmetric key generator 406. Public key 410 is used in conjunction with a private key 408. Private key 408 is preferably used to sign the license by the license-generating component, as described below, while public key 410 is inserted into the program for use in verifying the license by the descrambler software program.

C-level generator 402 preferably uses this input data to create at least code for the scrambler/descrambler functions, and optionally also creates code for license verifiers 412. The latter code is preferably identical to at least a portion of the scrambler/descrambler code, and is used later to generate the licenser program, as described in greater detail below. More preferably, any remaining meta-language directives are removed from license verifiers 412, but may optionally be maintained in the main scrambler/descrambler code.

The main generated scrambler/descrambler code is then preferably fed to a C-level obfuscator 414, for transforming the code into a format which is more difficult for a third party to analyze, while maintaining the required functionality. Preferably, such obfuscation is performed according to one or more instructions in magazine obtained from a C-level obfuscation magazine 416, containing random transformations as described before. The obscured code is then sent to a C compiler 418, which creates the actual compiled assembly code from the higher language code.

The compiled code, in assembly language, is optionally and more preferably further modified by an A-level generator 420 in order to further protect the code. A-level generator 420 preferably interprets one or more associated meta-language directives embedded in the code, optionally and more preferably in association with one or more instructions from a magazine received from an A-level algorithm magazine generator 422. The magazine preferably contains a selection of routines, and/or instructions for generating these routines, one or more of which may be inserted into the assembled code.

The modified assembly code is preferably passed to an A-level obfuscator 424, which transforms the assembly code into a more obscure form. For example, A-level obfuscator 424 optionally and preferably replaces direct jumps and calls with indirect jumps and calls, more preferably according to instructions from an A-level obfuscation magazine 426. The obscured code is then preferably passed to an assembler 428, which performs the final operations to create the final object code.

Turning back to the generation of the license, A-level obfuscator 424 also preferably generates the license constants for being passed to the licenser, and also preferably generates the content constants for being passed to the scrambler, both of which are further described with regard to FIG. 4B. The previously described license verifiers 412 are preferably passed to a C compiler 430, optionally with a license prototype 432, for creating the license. License prototype 432 is preferably implemented as program code, which requires the application of external values for parameters in order to be operative. License prototype 432 is preferably compiled with license verifiers 412 by C compiler 430. Optionally, this code is combined with the asymmetric key pair when being compiled by C compiler 430. The compiled code is then preferably passed to a linker 434, for creating the licenser software code 436.

FIG. 4B is a flow diagram of the remaining processes for creating the protected code. As shown, linker 434 preferably creates a map file 438, for determining the structure of the protected code. Map file 438 is then preferably fed to a symmetric encryptor 440. Symmetric encryptor 440 then encrypts that portion of the scrambler/descrambler code which is only required for operation by the head-end, preferably with a symmetric key. The symmetric key is more preferably present in a constant array in the scrambler/descrambler executable file.

In addition, the executable code for the scrambler/descrambler is preferably executed in scrambling mode in a code scrambler 442, for example for performing the BSG function, which results in an output BSG log file 444. Code scrambler 442 preferably also alters the code according to the license constants and/or content constants from FIG. 4A.

Optionally, the final prepared code is encrypted with a symmetric key 446, by a symmetric encryptor 448. The encrypted code is then preferably sent to the head-end for transmission to the end user.

Figure 5:
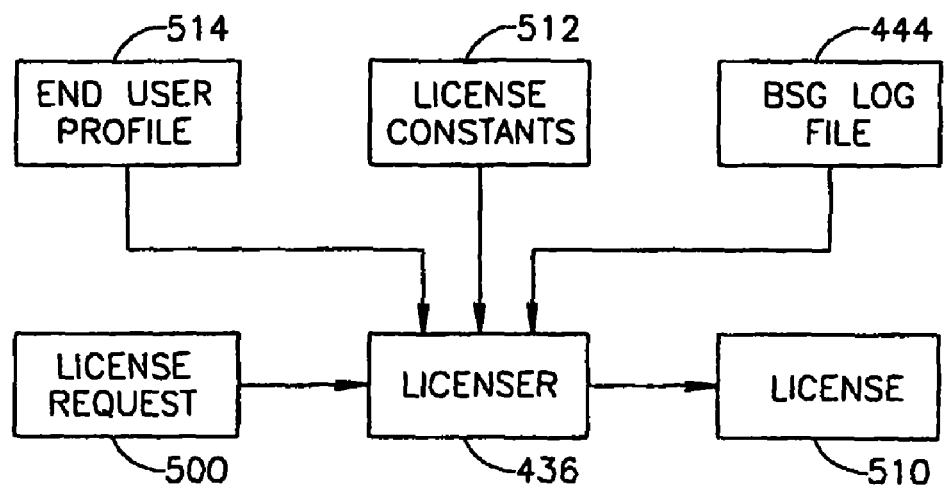
FIG. 5 is a flow diagram of an exemplary method for generating a license according to the present invention.

FIG. 5 illustrates an exemplary method for license generation according to the present invention, which method corresponds to stage 2 of FIG. 3. As shown, a plurality of inputs is preferably fed to licenser software code 436. This code is generated as described with regard to FIG. 4A previously. Licenser software code 436 preferably receives a license request 500, to create a license 510, optionally and more preferably with certain parameters (such as for single or multiple viewing for example). In order to create license 510, licenser software code 436 preferably receives license constants 512, which may optionally be generated by the A-level obfuscator of FIG. 4A for example. Licenser software code 436 also optionally and preferably receives BSG log file 444, which as previously described is preferably generated by the code scrambler of FIG. 4B. One or more identifiers 514 from the end user device's profile may also optionally be used as part of the license generating procedure.

Figure 6:
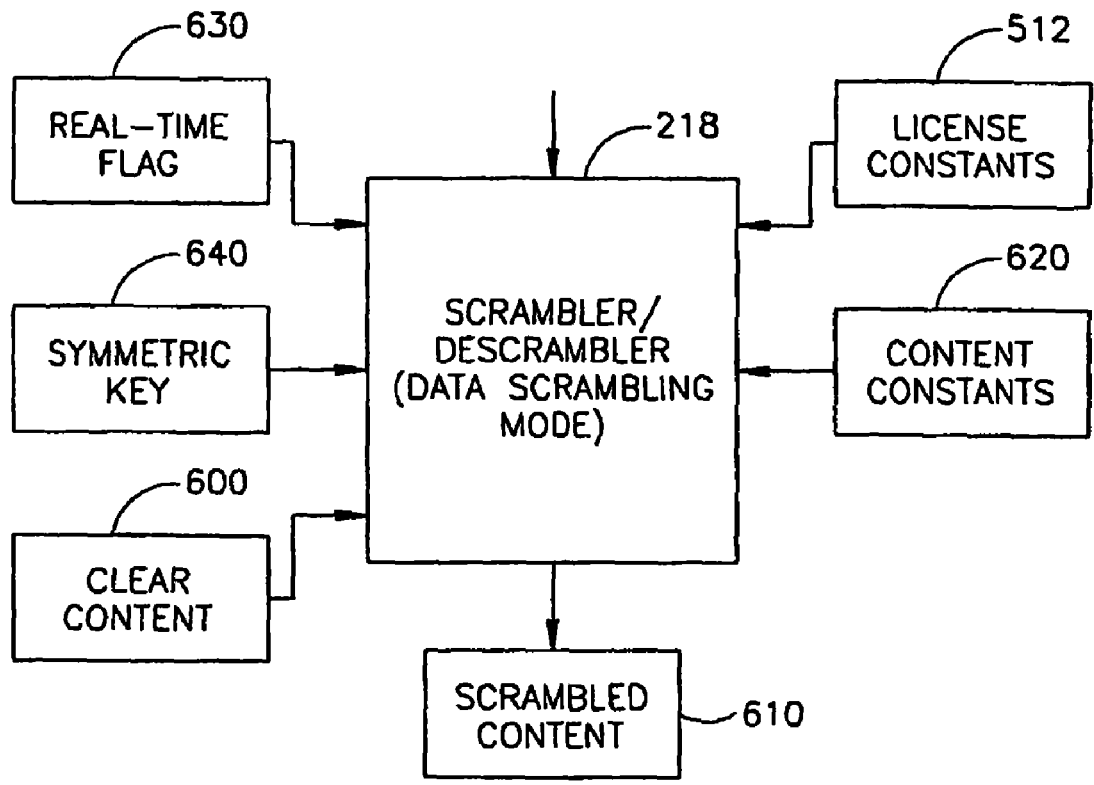
FIG. 6 is a flow diagram of an exemplary method for content scrambling according to the present invention.

FIG. 6 shows a flow diagram of an exemplary method for producing scrambled content according to the present invention, which corresponds to stage 3 of FIG. 3. As shown, scrambler 218 receives clear content 600, and produces scrambled content 610. Clear content 600 may optionally be compressed. Scrambler 218 preferably also receives license constants 512 and content constants 620, both of which are preferably generated by the A-level obfuscator of FIG. 4A. Scrambler 218 also optionally and more preferably receives a real-time flag 630, for protecting clear content 600 according to a timing mechanism and/or a timing-dependent protection scheme, and a symmetric key 640. These different types of input are preferably used to protect the content according to a security scheme, which itself is preferably varied, either as a separate input or as a result of the variability of the other inputs.

Figure 7:
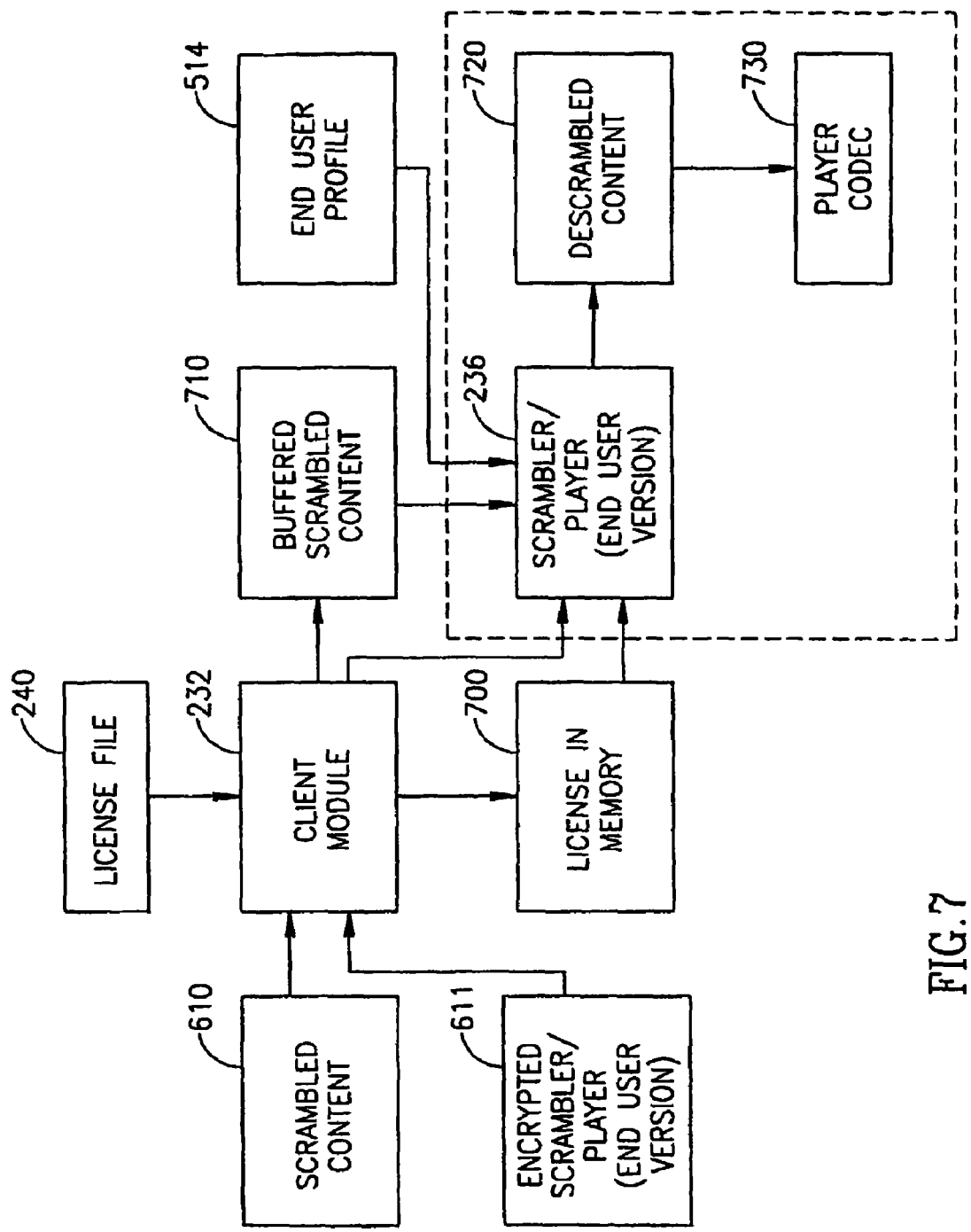
FIG. 7 is a flow diagram of an exemplary method for content descrambling according to the present invention.

FIG. 7 is a flow diagram of an exemplary method for content access by the end user device, which corresponds to stage 4 of FIG. 3. The exemplary method shown depends upon the presence of at least one type of pre-installed module, which in this illustration is client module 232, which could optionally be a Web browser plug-in as a non-limiting example. Client module 232 is preferably pre-installed on the end user device, although alternatively client module 232 could be installed upon transmission of a request for content by the end user device.

Client module 232 receives scrambled content 610, which preferably includes a protected descrambler/player 611. Protected descrambler/player 611 may in actual practice be merged with scrambled content 610, in which case descrambler/player 611 is not necessarily encrypted. Client module 232 produces buffered scrambled content 710 and buffered descrambler/player 236. As previously described, descrambler/player 236 is the end user device version, which optionally and more preferably includes non-accessible or concealed code for those functions which are only required for operation by the head-end. Client module 232 also preferably receives license 240 and places the contents into a memory version 700 of license 240.

Descrambler/player 236 then preferably reads buffered scrambled content 710, optionally with one or more end user device identifiers 514, and produces descrambled content 720. Descrambled content 720 is then preferably played back or otherwise displayed by a player 730, which is preferably produced from descrambler/player 236 in the descrambler/player combination. Player 730 may optionally be completely combined with the descrambler, such that descrambler/player 236 and player 730 are one unit; or alternatively, these may be two separate units. Also alternatively, the descrambler and the player may be completely separate and delivered as two separate units.

In order to further protect the protected content, preferably at least one type of information from the end user device is used for determining whether the end user device should be allowed to read the protected content, for creating a profile. Examples of such information were previously described, for example with regard to FIG. 2. Generally, the obtained information preferably has a number of characteristics. First, the information itself is preferably obtained from the end user device itself and/or from the subscriber who controls that device. Second, the exact value for the information preferably occurs at a relatively low frequency, or may even be unique to the particular end user device. Third, the combination is preferably unique or at least would be expected to occur at a low frequency, such that the ability of a hacker to use one such combination in more than one end user device is reduced or even eliminated. Fourth, all of the information gathered from the end user device does not necessarily need to be used for determining whether the end user device is allowed to read the protected content, even if such information forms part of the profile. Of course, these are only examples of some preferred characteristics of the gathered information; additional or alternative characteristics are also considered to be within the scope of the present invention.

Figure 8:
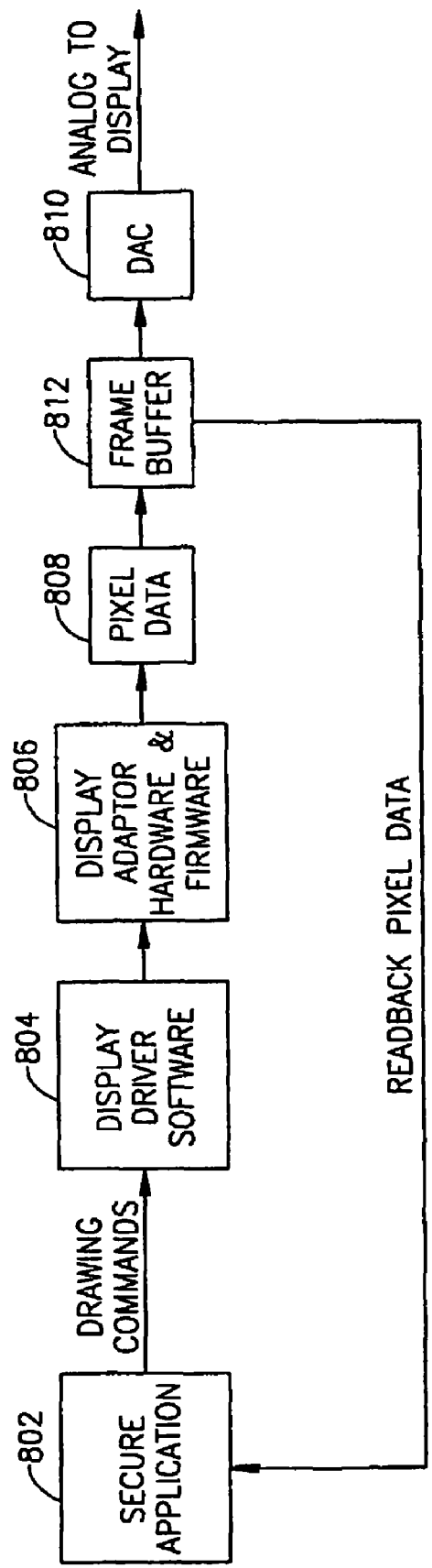
FIG. 8 shows a flow diagram of an exemplary method for generating at least one type of user profile information according to the present invention.

FIG. 8 is a flow diagram of a method for generating at least one type of user profile information, related to the end user device, in order to generate a signature for the end user device. The signature is therefore preferably unique to the particular device, or at the least, is difficult to "spoof" or to generate without the presence of the actual device, particularly in a limited bandwidth environment. The method operates overall by drawing certain shapes to the display adapter's video memory and reading back the pixel data thus generated.

FIG. 8 depicts the path that a video shape follows from creation by a secure application 802 to a display. The video shape is altered by this flow of operations, and the alterations are particular to specific combinations of hardware and software on the end user device.

In particular, a display driver 804, which is typically restricted to each advanced video adapter, and a display adapter 806 preferably cooperate in generating a pixel map of the desired display picture. Display adapter 806 may optionally be implemented as hardware or firmware, or a combination thereof. In any case, Digital to Analog Converters (DACs) 810 of display adapter 806 preferably scan this data to generate the high-speed raster data required to drive an analog display, or convert analog display data to appropriate digital formats for a digital display such as a LCD.

Modern display adapters 806 (and the appropriate system software) support readback from a frame buffer 812. The pixel values corresponding to the displayed picture (shown as pixel data 808) may therefore be read back. It should be noted that these pixel values may optionally be obtained even without displaying the picture, through the use of overlays.

The method according to the present invention depends on the fact that different display adapter driver/hardware/firmware combinations process graphics commands in a different way and arrive at a different pixel map. For example, ATI's "Crystal Fonts™" anti-aliasing feature is available on some display adapters to improve character readability by slightly modifying the character shape. Thus, pixels read off character edges would compare differently to the original drawn character depending upon whether the display adapter is enabled for the Crystal Fonts™ function.

In a similar manner, various display Adapters employ different 3-D rendering algorithms, aiming to improve rendering speed and/or image quality. As a side effect, pixels read back from portions of such 3-D displays would be different.

The flow of data through the method of FIG. 8 would then optionally enable data to be inserted into content, or otherwise generated, preferably as certain shapes. These shapes may be displayed or invisible, and may optionally be in the form of characters, three-dimensional objects and/or other recognizable shapes. The resulting pixel data is then preferably read back directly from the frame buffer, i.e. after all digital processing. This action is preferably performed once during registration of the end user device, and then is more preferably performed each time that the end user device has to be identified. Each such action may optionally be repeated many times, optionally and preferably placing different shapes in different locations, more preferably intermingled within many "naturally-occurring" displayed objects. Optionally some of these naturally occurring objects may be used rather than artificially-inserted objects.

A spoof is typically implemented through a small program that is inserted in the appropriate query data path (external to a secure program), and delivers the query's "expected response". A spoof may be thus widely distributed. The method of FIG. 8, as heretofore described, would not block recording the readback data stream external to the secure program. To prevent such recording from enabling the protection to be broken, preferably secure application 802 is implemented in order to read back the whole pixel map and to internally select the areas to be compared. Thus, to avoid reverse-engineering the secure program (i.e. "spoof"), the hacker would be forced to deliver the whole pixel map too. Each pixel map is large, and a large number of such pixel maps during secure program operation may optionally be used.

Thus, the amount of data the unauthorized user would have to transfer is potentially very large, well beyond typical bandwidth capabilities. The result is that the "display adapter signature" thus created is difficult to spoof.

According to optional embodiments of the present invention, the operation of the method and system of the present invention is preferably adjusted according to the number and/or type of different operating platforms of the end user devices. For example, if all end user devices are of a single type, having a single operating platform hardware and software operating system combination), then the operation of the security generating mechanism is preferably tailored to that single type of end user device. Alternatively, in a heterogeneous environment, for example an environment which contains PC computers and Macintosh™ computers, preferably the system features a plurality of different compilers, having functionality adjusted to the different types of operating platforms. These different compilers would preferably be fed with the same random parameters in order to generate the same security schemes, at least for defining the "essential algorithms" as previously explained. However, the random parameters used to define such items as anti-debugger code and/or lower level obfuscation may optionally be different, as these items are more reliant upon the different characteristics of the different operating platforms.

Thus the descrambler/player code for any additional platform is different from that of the "nominal" platform, but is preferably designed to be able to read and render content scrambled for the "nominal" platform. In other words, one content stream/file would preferably be able to serve multiple platforms.

In order to accomplish this preferred feature of the present invention, platform-specific data that is present within the content stream would preferably be converted to any alternative specific platform, for example through the use of offsets. The offset algorithm, however, could itself optionally be varied according to the overall scheme of the present invention.

The use of a universal virtual machine or underlying mechanism, such as Java for example, for implementing the present invention across a plurality of different platforms, is not preferred because such a virtual machine is less secure; the unauthorized user could access the program flow by modifying the virtual machine itself.

One of the main disadvantages of previously known protection schemes is that they typically rely upon a single protection method. Once this protection method has been "hacked", by breaking the method and/or by accessing a key or license which is required for authorized users, the unauthorized user can then typically access any data or software code which has been secured by that protection method. In addition, these protection methods are typically more vulnerable to automated attacks. The present invention overcomes this disadvantage of the background art by enabling multiple protection methods to be generated and used, each of which would appear to be completely different to the unauthorized user, and each of which would be difficult to break. On a psychological basis, unauthorized users may become frustrated after multiple attempts to gain unauthorized access to different pieces of content, such that even if the security for a single item of content is broken, other items of content cannot be accessed. Thus, at the very least, losses are minimized.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

While the invention has been described with respect to a limited number of embodiments, it will be appreciated that many variations, modifications and other applications of the invention may be made.

What is claimed is:

1. A method for generating a signature for an end user device, the end user device comprising at least video display hardware and video display software, the method comprising:
    processing video data by the video display hardware and the video display software, thereby altering at least a portion of the video data according to a characteristic of at least one of the video display hardware and the video display software to form altered data, wherein said processing video data comprises generating pixel values for said video data, and wherein said altering at least a portion of the video data during processing comprises altering at least a portion of said pixel values;
    forming the signature at the end user device based, at least in part, on said altered data;
    generating a user profile for said end user device using said signature; and
    transmitting said user profile to a headend for use in uniquely protecting content to be sent to said end user device.

2. The method of claim 1, wherein said pixel values are generated without displaying said video data.

3. The method of claim 1, wherein said signature comprises a registration signature initially used to register said end user device.

4. The method of claim 1, the method further comprising: reading back said pixel values, thereby producing read-back pixel values.

5. The method of claim 4, the method further comprising: comparing said read-back pixel values with a registration signature to identify said end user device.

6. The method of claim 5, wherein said signature comprises data to be inserted into content.

7. The method of claim 6, wherein said data to be inserted into content comprises one or more shapes.

8. The method of claim 7, wherein said one or more shapes are for being displayed.

9. The method of claim 7, wherein said one or more shapes are invisible.

10. The method of claim 7, wherein said one or more shapes are in the form of at least one of the following: characters; three-dimensional objects; and other recognizable shapes.

11. The method of claim 7, wherein said processing, said altering, and said forming are repeated one or more times to insert different shapes in different locations in said content.

12. The method of claim 7, wherein said shapes are intermingled with naturally-occurring displayed objects.

13. The method of claim 7, wherein said end user device further comprises a secure application operable to: create said one or more shapes; read back all of said pixel values; and internally select pixel values to use in said comparing.

14. The method of claim 1, wherein said signature comprises data naturally-occurring in content.

15. The method of claim 1, wherein said signature is unique to said end user device.

16. A signature generation apparatus comprising:
    video display hardware; and
    video display software, wherein the video display hardware and the video display software are operable to:
        process video data thereby altering at least a portion of the video data according to a characteristic of at least one of the video display hardware and the video display software to form altered data, wherein said processing video data comprises generating pixel values for said video data, and wherein said altering at least a portion of the video data during processing comprises altering at least a portion of said pixel values;
        form a signature based, at least in part, on said altered data;
        generate a user profile for said signature generation apparatus from said signature; and
        transmit said user profile to a headend for use in uniquely protecting content to be sent to said signature generation apparatus.

17. Apparatus for generating a signature, said apparatus comprising:
    hardware means for processing video data; and
    software means for processing video data, wherein said hardware means and said software means are for:
        processing video data thereby altering at least a portion of video data according to a characteristic of at least one of the hardware and software means to form altered data, wherein said processing video data comprises generating pixel values for said video data, and wherein said altering at least a portion of the video data during processing comprises altering at least a portion of said pixel values;
        forming a signature based, at least in part, on said altered data;
        generating a user profile from said signature for said apparatus for generating a signature; and
        transmitting said user profile to a headend for use in uniquely protecting content to be sent to said apparatus for generating a signature.

* * * * *

UNITED STATES PATENT AND TRADEMARK OFFICE
CERTIFICATE OF CORRECTION

| | | |
|---|---|---|
| PATENT NO. | : 7,920,702 B2 | |
| APPLICATION NO. | : 12/388717 | |
| DATED | : April 5, 2011 | |
| INVENTOR(S) | : Shen-Orr et al. | |

It is certified that error appears in the above-identified patent and that said Letters Patent is hereby corrected as shown below:

Title page, item [56]

please Add:

4,465,901A    8/1984    Best
       4,685,055A    8/1987    Thomas

Signed and Sealed this
Twenty-fourth Day of May, 2011

David J. Kappos
*Director of the United States Patent and Trademark Office*